United States Patent
Beasley et al.

(10) Patent No.: US 11,138,053 B2
(45) Date of Patent: Oct. 5, 2021

(54) ADAPTIVE QUOTA MANAGEMENT SYSTEM

(71) Applicant: Matrixx Software, Inc., Saratoga, CA (US)

(72) Inventors: Shane Beasley, Mountain View, CA (US); David Labuda, Hillsborough, CA (US); Norin Saxe, Los Gatos, CA (US); Ian Marshall, Sunnyvale, CA (US)

(73) Assignee: Matrixx Software, Inc., Saratoga, CA (US)

( * ) Notice: Subject to any disclaimer, the term of this patent is extended or adjusted under 35 U.S.C. 154(b) by 0 days.

(21) Appl. No.: 16/785,282

(22) Filed: Feb. 7, 2020

(65) Prior Publication Data

US 2020/0174862 A1 Jun. 4, 2020

Related U.S. Application Data

(63) Continuation of application No. 16/273,503, filed on Feb. 12, 2019, now Pat. No. 10,592,320, which is a continuation of application No. 15/938,354, filed on Mar. 28, 2018, now Pat. No. 10,248,480, which is a continuation of application No. 14/634,675, filed on Feb. 27, 2015, now Pat. No. 9,959,152.

(51) Int. Cl.
| | |
|---|---|
| *G06F 15/16* | (2006.01) |
| *G06F 11/00* | (2006.01) |
| *H04L 12/911* | (2013.01) |
| *H04L 29/08* | (2006.01) |
| *H04L 12/26* | (2006.01) |
| *G06Q 20/14* | (2012.01) |
| *G06Q 20/28* | (2012.01) |

(52) U.S. Cl.
CPC ........... *G06F 11/00* (2013.01); *G06Q 20/145* (2013.01); *G06Q 20/28* (2013.01); *H04L 43/0817* (2013.01); *H04L 43/16* (2013.01); *H04L 47/822* (2013.01); *H04L 67/32* (2013.01)

(58) Field of Classification Search
CPC .............................. H04L 47/822; H04L 12/14
USPC ......................................................... 709/206
See application file for complete search history.

(56) References Cited

U.S. PATENT DOCUMENTS

| | | |
|---|---|---|
| 6,762,994 B1 | 7/2004 | Mitchell |
| 7,873,074 B1 | 1/2011 | Boland |
| 8,176,167 B2 | 5/2012 | Fok |
| 8,224,289 B2 | 7/2012 | Poltorak |
| 8,275,711 B2 | 9/2012 | Jackowski |

(Continued)

FOREIGN PATENT DOCUMENTS

| | | |
|---|---|---|
| WO | 2011020498 | 2/2011 |
| WO | 2014108801 | 7/2014 |

OTHER PUBLICATIONS

Urgaonkar et al., An analytical model for multi-tier internet services and its applications; 291-302, Jun. 6-10, 2005.

*Primary Examiner* — Hamza N Algibhah
(74) *Attorney, Agent, or Firm* — Van Pelt, Yi & James LLP

(57) ABSTRACT

A system for determining a quota comprises an input interface and a processor. The input interface is configured to receiving a current workload. The processor is configured to: determine whether the current workload less than or equal to target workload; and in response to the current workload being less than or equal to target workload: indicate no modification to input values; set output values to input values; and provide the output values.

21 Claims, 12 Drawing Sheets

(56) References Cited

U.S. PATENT DOCUMENTS

| | | | |
|---|---|---|---|
| 2005/0193023 A1* | 9/2005 | Ismail | G06F 9/5016 |
| 2008/0256537 A1* | 10/2008 | Fachan | G06F 3/0605 |
| | | | 718/1 |
| 2010/0228655 A1 | 9/2010 | Chen | |
| 2011/0044353 A1 | 2/2011 | Foottit | |
| 2012/0117235 A1 | 5/2012 | Castro Castro | |
| 2013/0148668 A1* | 6/2013 | Kean | H04L 12/1435 |
| | | | 370/401 |
| 2014/0018033 A1 | 1/2014 | Luna | |
| 2014/0036677 A1* | 2/2014 | Draznin | H04L 67/101 |
| | | | 370/235 |
| 2014/0143300 A1* | 5/2014 | Karlsson | H04L 67/101 |
| | | | 709/203 |
| 2014/0269399 A1 | 9/2014 | Patel | |
| 2014/0378094 A1* | 12/2014 | Gillick | H04M 15/7652 |
| | | | 455/406 |
| 2015/0039680 A1* | 2/2015 | Gallant | H04L 65/60 |
| | | | 709/203 |
| 2015/0105045 A1* | 4/2015 | Rolfe | H04M 15/765 |
| | | | 455/406 |
| 2015/0188840 A1 | 7/2015 | Xiao | |
| 2015/0189043 A1* | 7/2015 | Cha | H04L 67/22 |
| | | | 709/219 |
| 2015/0222546 A1* | 8/2015 | Van Phan | H04W 36/0005 |
| | | | 709/226 |
| 2015/0249621 A1* | 9/2015 | Tian | G06F 16/122 |
| | | | 709/226 |
| 2015/0288827 A1* | 10/2015 | Bejerano | H04M 17/10 |
| | | | 455/406 |
| 2015/0381522 A1* | 12/2015 | Cai | H04L 47/803 |
| | | | 370/389 |

\* cited by examiner

ADAPTIVE QUOTA MANAGEMENT SYSTEM

CROSS REFERENCE TO OTHER APPLICATIONS

This application is a continuation of U.S. patent application Ser. No. 16/273,503, now U.S. Pat. No. 10,592,320, entitled ADAPTIVE QUOTA MANAGEMENT SYSTEM filed Feb. 12, 2019 which is incorporated herein by reference for all purposes, which is a continuation of U.S. patent application Ser. No. 15/938,354, entitled ADAPTIVE QUOTA MANAGEMENT SYSTEM filed Mar. 28, 2018, now U.S. Pat. No. 10,248,480, which is a continuation of U.S. patent application Ser. No. 14/634,675, entitled ADAPTIVE QUOTA MANAGEMENT SYSTEM filed Feb. 27, 2015, now U.S. Pat. No. 9,959,152, both of which are incorporated herein by reference for all purposes.

BACKGROUND OF THE INVENTION

Systems for determining a quota include connectivity devices, a network, a service provider, and a quota management system. The processing load on the service provider and quota management system is driven largely by the number of authorization requests and responses that must be exchanged between the service provider and the quota management system. Therefore sizing the infrastructure for the service provider and quota management system requires an understanding of what the expected peak rate of requests/responses will be (often called TPS or transactions per second). The TPS is determined by the number of connectivity devices times the average number of activities (sometimes called sessions) per device times the average frequency at which each activity or session must reauthorize for a new quota. For instance, in the event that there is a system with 1 million connectivity devices, and each device is engaged in an average of 3 activities, and the quotas being authorized run out or expire in an average of 5 minutes, then the resulting load on the service provider and quota management system will be 3 million quota requests/responses every 5 minutes, which translates to 10,000 TPS.

Many of the service provider and quota management system solutions available were designed originally to work with connectivity devices that primarily supported voice calling. The usage loads (e.g. average calls per day per device) and usage patterns (e.g., peak calls per hour per device) for voice calling across a large set of connectivity devices is quite predictable to within a few percent. In addition, the quota being authorized for voice calls has traditionally been "minutes", and a voice call would always consume one minute for each minute that the call was connected, so it was obvious how long a given quota would last before a new authorization request was required (e.g. if 10 minutes was authorized, the next request will come after 10 minutes). As a result, all the factors that feed into calculating the peak TPS required from the service provider and quota management system can be controlled or predicted so the necessary infrastructure can be easily allocated to these systems. In addition, a very simple algorithm for determining how much quota to authorize was sufficient to maintain a consistent peak load on these systems (many of these traditional solutions simply had a configured quota quantity that was always applied, e.g. "3 minutes").

With the advent of smart connectivity devices (e.g. the iPhone), very fast networks (e.g. 4G/LTE), and the myriad of digital services available (e.g. video, HD video, chat, facebook, twitter, email, web browsing, etc.), the usage patterns for connectivity devices have become extremely spiky and unpredictable, and the overall volume of usage has skyrocketed. In addition, the quota authorized for most digital services is a volume of usage, not a time period of usage, so it is no longer obvious how long a quota authorized will last and a new authorization request will be required since it depends entirely on how fast the authorized volume quota is consumed and that depends on many factors such as the power of the connectivity device, the speed of the network, the congestion level of the network, the type of activity, etc. The combination of this extremely high volume but unpredictable usage and the complex relationship between a quota volume and the time it will last before being consumed creates a major threat to the service provider and quota management system since the peak load can no longer be predicted with any accuracy. In the event that the service provider and quota management system infrastructure are not sized sufficiently to handle the peak TPS, service interruptions or system failure will result, causing significant negative business consequences to the service provider.

BRIEF DESCRIPTION OF THE DRAWINGS

Various embodiments of the invention are disclosed in the following detailed description and the accompanying drawings.

DETAILED DESCRIPTION

Figure 1:
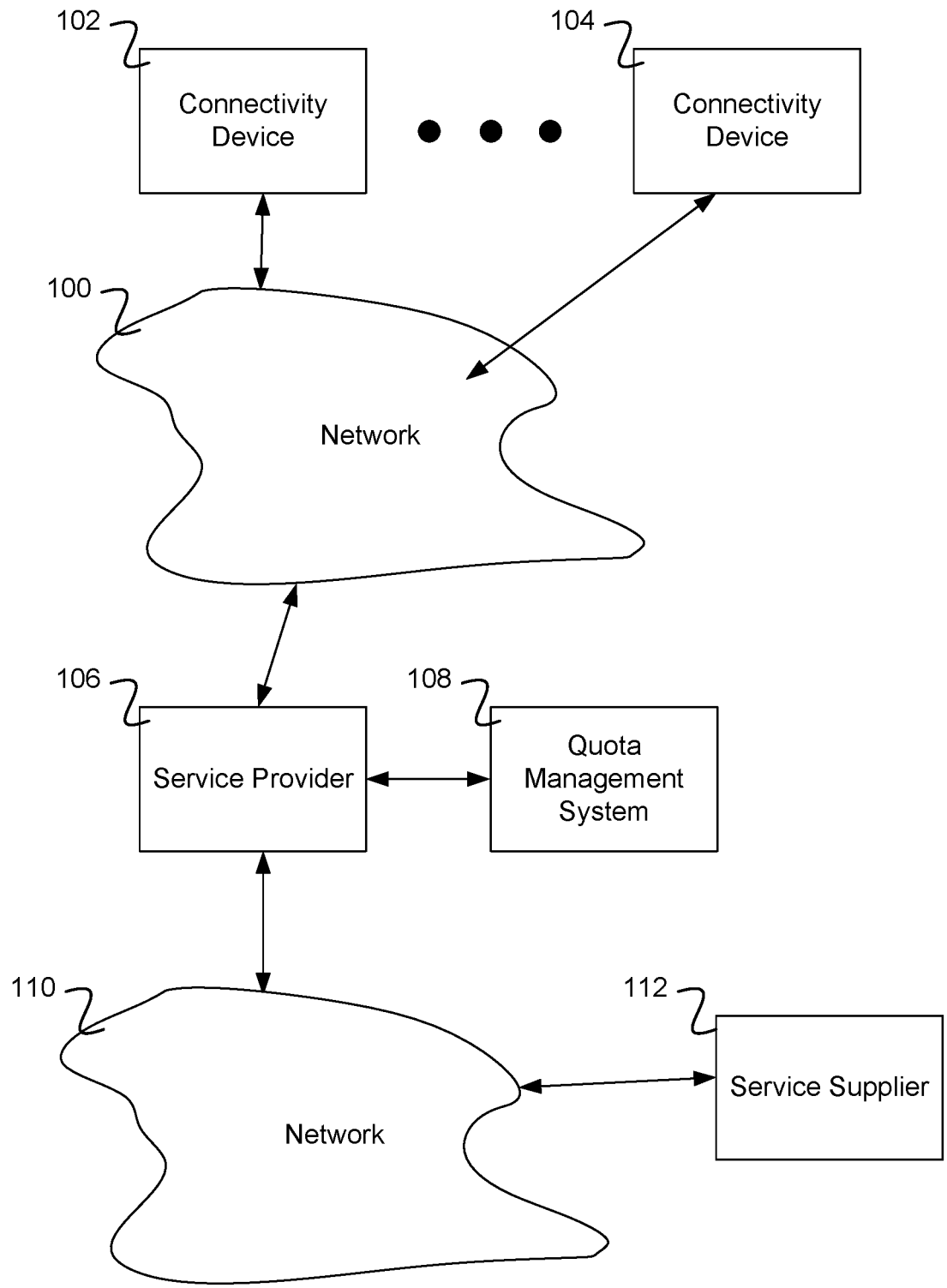
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a quota is disclosed. A system for determining a quota comprises an input interface, a candidate quota determiner, one or more quota modification determiners, and an output interface. The input interface is for receiving a quota request for an activity and receiving an estimation or an actual measurement of one or more operating parameters. A candidate quota determiner is for determining a candidate quota amount based at least in part on candidate quota parameters. One or more quota modification determiners is/are for determining one or more quota modifications based on the estimation or the actual measurement of the one or more operating parameters. An output interface is for providing a final quota amount based at least in part on the candidate quota amount and the one or more quota modifications.

In some embodiments, a communications service provider (e.g. a telecommunications, Internet, mobile service, digital service, or entertainment/media service provider) charges for its services (e.g., data downloaded, call time, messages sent, amount of media played) against account balances maintained on a quota management system. When a connectivity device attempts to perform some activity using the service, the service provider makes a request to a quota management system to authorize that activity. In the event the quota management system authorizes the activity, it grants a quota comprising an amount of service that may be used and a validity time at which the granted quota expires. The quota management system reserves the amount (e.g., cost) of the granted quota against the appropriate account balances (e.g. reserving 10 Mb of a user's monthly allowance to grant a 10 Mb quota for mobile data usage, or reserving $0.30 of a user's currency balance to grant a 3 minute quota for a phone call that costs $0.10/minute). In the event the activity is completed, the granted quota is exhausted or expired, or the service provider determines for any other reason that such action is prudent, the service provider will report back to the quota management system to indicate the portion of the granted quota that was consumed, and optionally to request authorization of a new quota for continued service for the activity. The quota management system will then release any unused quota from the previous grant, deduct from the appropriate account balances the appropriate amounts for the quota that was actually consumed, and, if requested, attempt to authorize and grant a new quota. For a long running activity such as watching a movie, this reporting and reauthorizing may occur hundreds or even thousands of times between the service provider and the quota management system for a single activity.

However, due to any number of conflicting factors, it is challenging for the quota management system to determine the optimal amount and validity time of each quota granted. For example, the actual rate at which the activity will consume the granted quota may be highly variable depending on the specifics of the activity (e.g. web browsing vs. HD video), or even for the same activity based on network status (e.g. congestion of a cell site), specific device behavior (e.g. pausing a movie), or any number of unpredictable factors. If the quota granted is too small given the actual rate of consumption, or the validity time is too short, it requires the service provider to report consumption and request new quota too frequently, putting a high and potentially system threatening load onto the service provider and quota management system and/or causing service interruptions of the activity due to delays in the service provider receiving new quota. If the quota granted is too large given the actual rate of consumption, or the validity time is too long, the balance amount that was reserved stays reserved too long and cannot be used for other activities by the same device or other devices that share the same balance, causing an unnecessary denial of service for the other activities. In addition, the quota management system does not know how much of a granted quota has been actually consumed until the service provider reports back, so the amount of a balance reserved for a granted quota creates an ambiguity in the actual value of that balance until the quota consumption is reported. It is desirable for the quota management system to have an accurate view of the account balances, especially near thresholds that trigger an action (e.g. sending a text notification when an account balance has been consumed to a specific point such as 50% or 85% of its limit). This ambiguity is quickly compounded in the event that a balance is being reserved by many parallel activities for a connectivity device or set of connectivity devices, degrading the effectiveness of the action trigger.

In some embodiments, the system for determining a quota comprises a candidate quota determiner to determine a candidate quota based on candidate quota parameters defined or configured in the system, one or more quota modification determiners to determine proposed or actual quota modifications based at least in part on the estimation or actual measurement of one or more operating parameters related to the system, and optionally a quota assembler to determine the final quota to be authorized based at least in part on the candidate quota and any or all proposed quota modifications.

In some embodiments, the system for determining a quota comprises a candidate quota determiner, one or more quota modification determiners and a quota assembler, where the outputs of the quota modification determiners are inputs to the quota assembler as proposed quota modifications and the quota assembler determines the final quota to be authorized.

In some embodiments, the system for determining a quota comprises a candidate quota determiner and one or more quota modification determiners, where each quota modification determiner applies an actual quota modification to the candidate quota as it is executed and the final quota to be authorized is equal to the resulting value of the candidate quota after all quota modification determiners have been executed.

In some embodiments, the candidate quota parameters defined or configured in the system include a candidate quota target value, a candidate quota minimum value, a candidate quota maximum value, or any and all combinations of these.

In some embodiments, the candidate quota parameters defined or configured in the system are different for different types of activity (e.g. video, high definition video, voice call, email, texting, and music download, etc.)

In some embodiments, the candidate quota parameters defined or configured in the system are different depending on the commercial offer the customer has purchased.

In some embodiments, the candidate quota determined by the candidate quota determiner includes a target value, a minimum value, a maximum value, or any and all combinations of these.

In some embodiments, a candidate quota, proposed or actual quota modifications and/or final quota comprise an amount of quota to be authorized and a validity time for when the quota expires.

In some embodiments, a proposed or actual quota modification comprises a delta amount and/or scaling factor to be applied to the candidate quota.

In some embodiments, the ideal values for an operating parameter are defined or configured as a target value, a minimum value, a maximum value, or any and all combinations of these.

In some embodiments, a quota modification determiner determines proposed or actual quota modifications based at least in part on the estimation or actual measurement of one or more operating parameters (OP) related to the system.

In some embodiments, a quota modification determiner determines proposed or actual quota modifications based at least in part on OP and the candidate quota (CQ).

In some embodiments, a quota modification determiner determines proposed or actual quota modifications based at least in part on OP and ideal values (IV) for one or more operating parameters defined or configured in the system.

In some embodiments, a quota modification determiner determines proposed or actual quota modifications based at least in part on OP, IV, and a look-up table (LT) or similar data structure that provides the desired quota modifications based on the operating parameter values estimated or actually measured, the ideal values of the operating parameters defined or configured in the system, the difference between the preceding values, or any and all combinations of these.

In some embodiments, a quota modification determiner determines proposed or actual quota modifications based at least in part OP, IV and a continuous feedback equation (FE) (e.g. an exponential response curve or a geometric decay curve) that provides the desired quota modifications based on the operating parameter values estimated or actually measured, the ideal values of the operating parameters defined or configured in the system, the difference between the preceding values, or any and all combinations of these.

In various embodiments, a quota modification determiner determines a quota modification based at least in part on: OP, IV, LT, CQ, FE, or any combination or permutation of the above (e.g., OP+IV, OP+LT, OP+CQ, OP+FE, IV+LT, IV+CQ, IV+FE, LT+CQ, LT+FE, CQ+FE, OP+IV+LT, OP+IV+CQ, OP+IV+FE, OP+LT+CQ, OP+LT+FE, OP+CQ+FE, IV+LT+CQ, IV+LT+FE, LT+CQ+FE, OP+IV+LT+CQ, OP+IV+LT+FE, or any other permutation or combination, etc.), or any other appropriate manner of determining a quota modification.

In some embodiments, a quota modification determiner determines proposed or actual quota modifications based at least in part on the estimation or actual measurement of the rate quota (QR) (e.g., the operating parameter of a quota rate) is being consumed by the activity being authorized.

In some embodiments, a quota modification determiner determines proposed or actual quota modifications based at least in part on the estimation or actual measurement of the frequency of reauthorization requests (RR) (e.g., the operating parameter of a frequency of reauthorization requests), either for the activity being authorized, or by a subset of or all activities being authorized by the system, or a combination of both.

In some embodiments, a quota modification determiner determines proposed or actual quota modifications based at least in part on the estimation or actual measurement of the workload (WL) (e.g., the operating parameter of a workload) on the system, the workload on surrounding systems, or a combination of both.

In some embodiments, the workload on the system and/or surrounding systems is determined from one or more of the following workload parameters: the CPU utilization, the network utilization, the storage system utilization, the memory utilization, the rate of requests to the system, the latency of the system to respond to requests, any combination of the preceding, or any other method commonly associated with determining the workload of a system.

In some embodiments, a quota modification determiner determines proposed or actual quota modifications based at least in part on the estimation or actual measurement of the rate at which a balance is being consumed (BR) (e.g., the operating parameter of a balance consumption rate), either by the activity being authorized, by a subset of or all activities that are consuming the balance (e.g., the balance associated with the quota request), or a combination of both.

In some embodiments, a quota modification determiner determines proposed or actual quota modifications based at least in part on the estimation or actual measurement of the number of activities or connectivity devices that are currently and/or could theoretically begin consuming a balance (BS) (e.g., the operating parameter of a number of balance consumers).

In some embodiments, a quota modification determiner determines proposed or actual quota modifications based at least in part on the estimation or actual measurement of the distance between a current balance value and a defined or configured threshold balance value for the balance (BT) (e.g., the operating parameter of a balance-threshold distance).

In various embodiments, the operating parameters QR, RR, WL, BR, BS, and BT are used to determine a quota modification in any permutation or combination (e.g., any pair, any 3, any 4, any 5, or all 6 of the operating parameters), or any other appropriate operating parameter(s) permutations or combinations thereof.

In some embodiments, the adaptive quota management system comprises a set of functional systems used in the determination of a quota amount to assign to the device. The adaptive quota management system comprises a candidate quota determiner for computing a candidate quota value. In some embodiments, the candidate quota determiner uses a historical quota consumption velocity (e.g., 48 seconds of activity/min, 2.22 MB/min, etc.) to determine a quota amount corresponding to a desired quota validity time (QVT)—for example, the maximum amount of time until the service provider needs to report the used portion of the quota. In some embodiments, the candidate quota determiner adjusts the determined quota amount above a minimum quota amount and below a maximum quota amount. In various embodiments, in the event the historical quota consumption velocity is not available, the candidate quota value is determined to be a minimum value, a value corresponding to a minimum time, a default value, a maximum value, or any other appropriate value.

In some embodiments, a system for determining a quota comprises connectivity devices, a network, a service provider, and a quota management system. The processing load on the service provider and quota management system is driven largely by the number of authorization requests and responses that must be exchanged between the service provider and the quota management system. Therefore sizing the infrastructure for the service provider and quota management system requires an understanding of what the expected peak rate of requests/responses will be (often called TPS or transactions per second). The TPS is determined by the number of connectivity devices times the average number of activities (sometimes called sessions) per device times the average frequency at which each activity or session must reauthorize for a new quota. For instance, in the event that there is a system with 1 million connectivity devices, and each device is engaged in an average of 3 activities, and the quotas being authorized run out or expire in an average of 5 minutes, then the resulting load on the service provider and quota management system will be 3 million quota requests/responses every 5 minutes, which translates to 10,000 TPS.

In some embodiments, many of the service provider and quota management system solutions available where designed originally to work with connectivity devices that primarily supported voice calling. The usage loads (e.g. avg. calls per day per device) and usage patterns (e.g. peak calls per hour per device) for voice calling across a large set of connectivity devices is quite predictable to within a few percent. In addition, the quota being authorized for voice calls has traditionally been "minutes", and a voice call would always consume one minute for each minute that the call was connected, so it was obvious how long a given quota would last before a new authorization request was required (e.g. if 10 minutes was authorized, the next request will come after 10 minutes). As a result, all the factors that feed into calculating the peak TPS required from the service provider and quota management system can be controlled or predicted so the necessary infrastructure can be easily allocated to these systems. In addition, a very simple algorithm for determining how much quota to authorize was sufficient to maintain a consistent peak load on these systems (many of these traditional solutions simply had a configured quota quantity that was always applied, e.g. "3 minutes").

In some embodiments, with the advent of smart connectivity devices (e.g. the iPhone), very fast networks (e.g. 4G/LTE), and the myriad of digital services available (e.g. video, HD video, chat, facebook, twitter, email, web browsing, etc.), the usage patterns for connectivity devices have become extremely spiky and unpredictable, and the overall volume of usage has skyrocketed. In addition, the quota authorized for most digital services is a volume of usage, not a time period of usage, so it is no longer obvious how long a quota authorized will last and a new authorization request will be required since it depends entirely on how fast the authorized volume is consumed and that depends on many factors such as the power of the connectivity device, the speed of the network, the congestion level of the network, the type of activity, etc. The combination of this extremely high volume but unpredictable usage and the complex relationship between a quota volume and the time it will last before being consumed creates a major threat to the service provider and quota management system since the peak load can no longer be predicted with any accuracy. In the event that the service provider and quota management system infrastructure are not sized sufficiently to handle the peak TPS, service interruptions or system failure will result, causing significant negative business consequences to the service provider.

In some embodiments, some of the traditional systems have expanded their quota calculation algorithms to take certain parameters into account. For instance, the expected rate of consumption for quota is related to the type of activity being performed. HD video will consume quota much faster than email under typical conditions, so the quota management system may allow a configuration to be specified that provides a quota volume of 30 Mb for an HD video activity but only provides a quota volume of 1 Mb for an email activity. This is an improvement over a single parameter for all circumstances, but it is still making very generalized assumptions about how fast quota will be consumed by each activity. As such, when operating conditions deviate from typical, the quota volume being authorized will not be optimal, the TPS load on the service provider and quota management system may exceed what was predicted, and service interruption or system failure may result.

In some embodiments, to truly manage the peak TPS load properly, a system is required that more accurately predicts or measures the operating parameters that feed into creating the TPS load. Such a system can then adjust the quota volume being authorized to manage the peak TPS load and avoid any service interruption or system failure. However, each adjustment to the quota volume authorized has business implications that may be important to take into account. For instance, in the event that there are many connectivity devices sharing a single account balance (e.g. a family plan), granting a very large quota to one connectivity device may reduce the expected TPS load, but it also unfairly allocates too much of the shared balance to that one connectivity device and potentially causes service to be unnecessarily denied to the other connectivity devices in the shared plan. Thus, the truly optimal quota volume to allocate each time quota is requested may require the analysis of one or more operating parameters, each providing potential adjustments to the quota volume to optimize that parameter.

An adaptive quota management system is disclosed. In some embodiments, the adaptive quota management system determines a quota amount and validity time for a device accessing a service provider to perform a particular activity. In some embodiments, the adaptive quota management system comprises part of a quota management system for determining whether the device is authorized to perform that activity. In some embodiments, authorization comprises the availability of account balance(s) against which the activity may be charged. In the event activity is authorized, quota is granted, and a corresponding amount of account balance(s) is reserved toward the anticipated quota use. In some embodiments, quota comprises an amount of data, an amount of time, or any other appropriate amount for that activity. In some embodiments, quota comprises a validity time at which the quota expires. In the event that the quota amount is exhausted, the quota expires, or for any other appropriate reason, the service provider must return the quota to the quota management system and report the amount used. The adaptive quota management system uses historical and current system information to adaptively determine an appropriate quota amount and validity time. In various embodiments, until the service provider has released a quota and reported the amount used, the quota management system is uncertain of the amount being used from that quota, the applicable charges for that usage, the account balance resulting from those charges, or any other appropriate system parameters. In various embodiments, in the event the assigned quota amount or validity time is too large, the quota management system risks presenting an inaccurate account balance to the user, reserving excessive account balance that may prevent granting of quota for other activities, and/or passing a threshold by an excessive amount, or any other appropriate consequence. In some embodiments, except for credit limit (e.g., out of balance), thresholds are "soft" in that in the event the thresholds are crossed it is desirable or required to detect that crossing as soon as possible (e.g., in some cases there is a requirement to provide an indication of passing a threshold—for example, a percentage of balance used (e.g., 50%, 80%, 90%, etc.)). In various embodiments, a threshold comprises a point where an account is out of balance, where an account changes its quota management policy, where an account is required to provide a warning, or where any other appropriate action needs to be taken. In some embodiments, usage is halted at a threshold—for example, a credit limit. In some embodiments, usage is not halted. In some embodiments, in the event the assigned quota amount or validity time is too small, the service provider may report usage and re-authorize quota too frequently.

FIG. 1 is a block diagram illustrating an embodiment of a network system. In the example shown, multiple connectivity devices (e.g., connectivity device 102, connectivity device 104, etc.) communicate with network 100. In some embodiments, the multiple connectivity devices (e.g., connectivity device 102, connectivity device 104, etc.) connect to network 100 via a wireless communication station (e.g., a cellular base station, a radio tower, etc.). In various embodiments, network 100 comprises one or more of the following: a cellular network, a local area network, a wide area network, a wired network, a wireless network, the Internet, an intranet, a storage area network, or any other appropriate communication network. In various embodiments, each of the multiple connectivity devices comprise one of the following: a mobile phone, a smartphone, a satellite phone, a tablet computer, a laptop computer, a personal computer, a set-top box, or any other appropriate connectivity device. In various embodiments, 2, 15, 93, 127, 1381, or any other appropriate number of connectivity devices are connected to network 100. Service provider 106 comprises a system for providing service to connectivity devices (e.g., connectivity device 102 and connectivity device 104).

In some embodiments, service provider 106 comprises a system for connecting connectivity devices to a second network (e.g., network 110). In various embodiments, network 110 comprises one or more of the following: a cellular network, a local area network, a wide area network, a wired network, a wireless network, the Internet, an intranet, a storage area network, or any other appropriate communication network. In some embodiments, service provider 106 comprises a system for connecting connectivity devices to a service supplier 112. In various embodiments, service supplier 112 supplies email, chat, voice communications, web content, video, business apps, social networking apps, or any other appropriate service. In various embodiments, service provider 106 comprises a system for connecting connectivity devices to any number of other networks 110 and service suppliers 112. Quota management system 108 comprises a system for managing quotas for connectivity devices. In some embodiments, quota management system 108 comprises a system for maintaining an account balance or balances for a connectivity device. In some embodiments, an account balance or balances maintained by quota management system 108 is associated with more than one connectivity device (e.g., as part of a family account, a business account, etc.). In various embodiments, quota management system 108 comprises a system for responding to a connection or service request (e.g., a connection or service request from a connectivity device), for placing reservations on an account balance, for allocating quota to a connectivity device, for deducting from an account balance, for determining a quota size, or for any other appropriate purpose. In some embodiments, when a connectivity device attempts to make a connection or receive a service, it contacts service provider 106 to request the connection or service. Service provider 106 contacts quota management system 108 to determine whether the connectivity device can be allowed to receive the requested service. In the event the connectivity device is allowed to receive the requested service, quota management system 108 determines a quota value for the connectivity device. In some embodiments, a quota value comprises a usage amount for the connectivity device before the service provider 106 is required to check in with quota management system 108 again. In some embodiments, quota management system 108 additionally places a reservation on an associated account balance or balances maintained by quota management system 108 (e.g., reserving the balance amount, or cost, represented by the quota).

Figure 2:
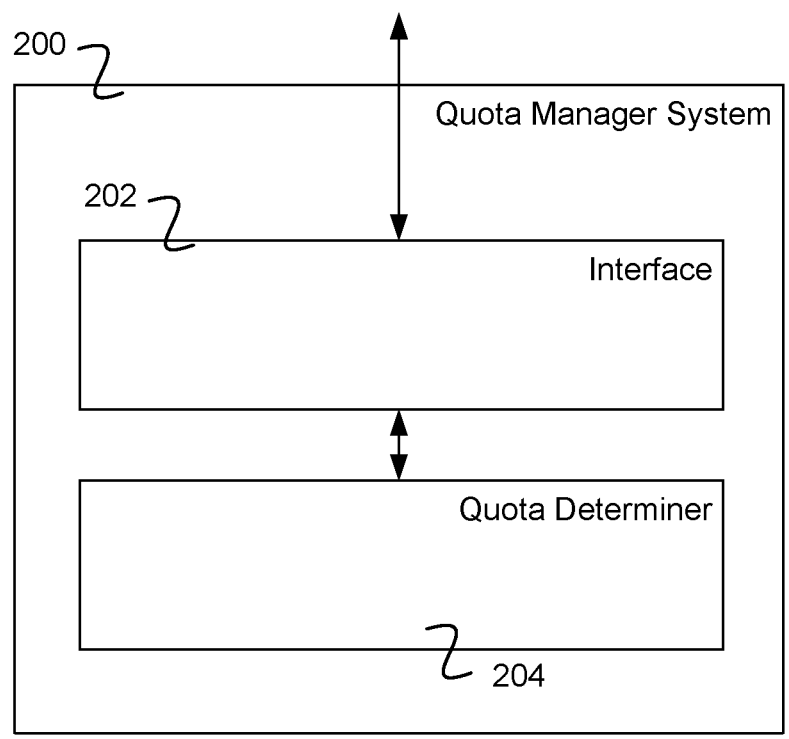
FIG. 2 is a block diagram illustrating an embodiment of a quota management system.

FIG. 2 is a block diagram illustrating an embodiment of a quota management system. In some embodiments, quota management system 200 comprises quota management system 108 of FIG. 1. In the example shown, quota management system 200 comprises interface 202. Interface 202 comprises an interface for communicating with service provider 106. In various embodiments, interface 202 comprises an interface for receiving a request for a quota, for receiving an update on quota used, for providing a quota value, requesting an account balance, for requesting account reservation information, for requesting a rate of change for a balance, for updating an account balance, for making an account balance reservation, or for any other appropriate communication. Quota determiner 204 comprises a quota determiner for determining a quota value. In various embodiments, quota management system 200 additionally comprises an account verifier, an account balance database, an account balance reserver, a usage rater, an account balance charger, or any other appropriate systems. In various embodiments, quota management system 200 comprises a hardware processor, a computer processor, a memory, a database, or any other appropriate implementation hardware.

In some embodiments, interface 202 is used for interacting with the service provider to request quota and report usage and quota management system 200 to grant quota. In various embodiments, quota management system 200 computes and stores (e.g., in an internal database—not shown in FIG. 2) balance information, historical usage information, velocity information, or any other appropriate information.

Figure 3A:
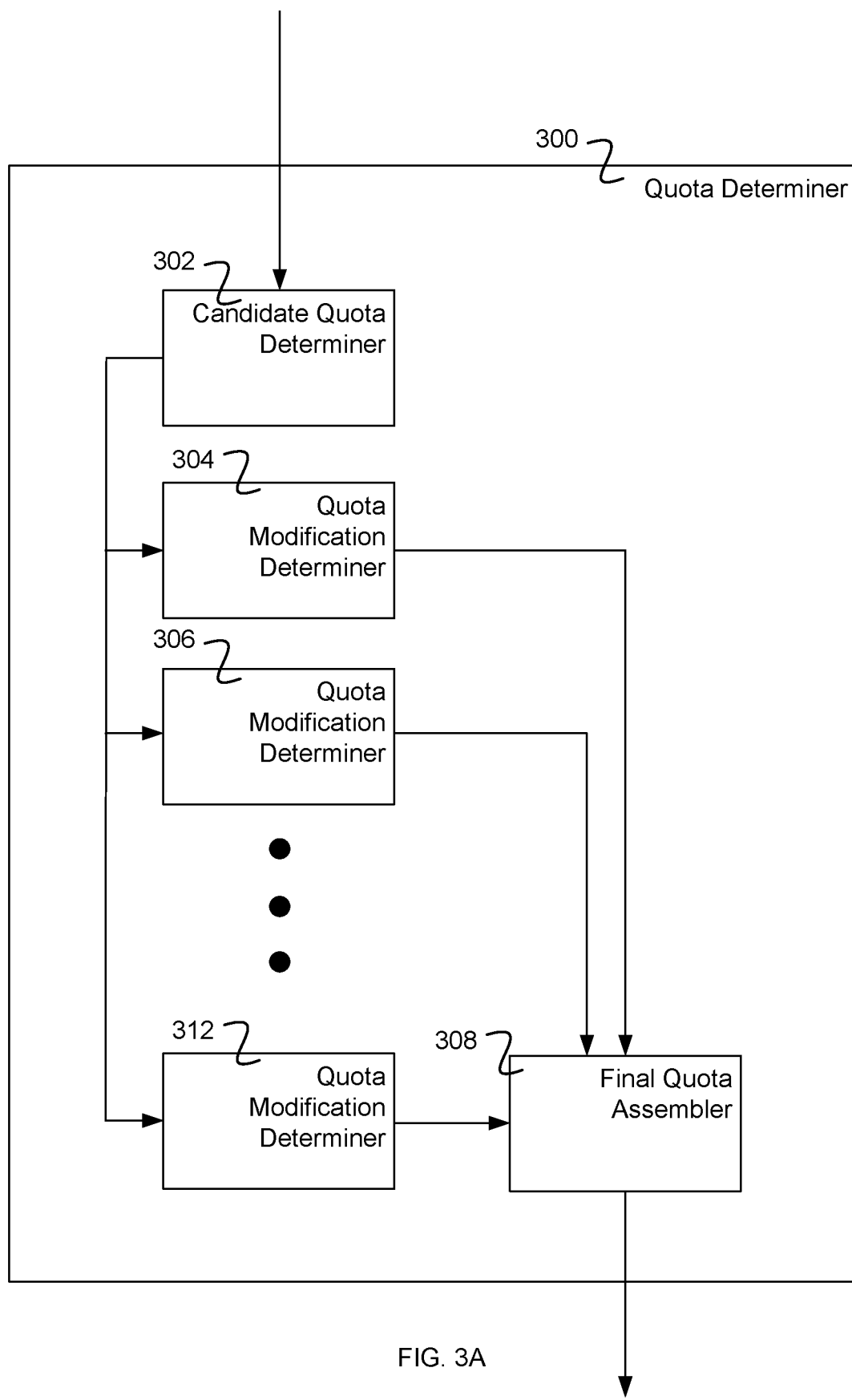
FIG. 3A is a block diagram illustrating an embodiment of a quota determiner.

FIG. 3A is a block diagram illustrating an embodiment of a quota determiner. In some embodiments, quota determiner 300 comprises quota determiner 204 of FIG. 2. In the example shown, quota determiner 300 comprises candidate quota determiner 302. Candidate quota determiner 302 determines a candidate quota value and/or a candidate validity time. In some embodiments, a candidate quota value is determined using a predetermined minimum quota value, target quota value, and maximum value. In some embodiments, a candidate quota value is determined using historical consumption velocity information. In some embodiments, a candidate quota determiner 302 is implemented using a processor. Candidate quota determiner 302 passes its values to one or more quota modification determiners (e.g., quota modification determiner 304, quota modification determiner 306, quota modification determiner 312, etc.). Each quota modification determiner modifies the outputs of the candidate quota determiner (e.g., a candidate quota value, a validity time, etc.) and passes modified values to final quota assembler 308. Final quota assembler 308 comprises a system for determining a final quota value. In some embodiments, final quota assembler 308 limits the final quota value determined by candidate quota determiner 302 using quota limits determined by one or more of the quota modification determiners. In some embodiments, final quota assembler 308 adopts a scaled quota value determined by a quota modification determiner. In various embodiments, final quota assembler 308 determines a final quota value and/or a final validity time by one of the following: an average of the quota modification output values, a median of the quota modification output values, a minimum of the quota modification output values, a maximum of the quota modification output values, selecting one of the quota modification output values, or any other appropriate determination of a final quota value. In some embodiments, quota assembler 308 is implemented using a processor. In various embodiments, candidate quota determiner 302, the one or more quota modification determiners, and final quota assembler 308 are implemented on separate processors, combined on a single processor, or combined on any appropriate number of processors in any appropriate way.

Figure 3B:
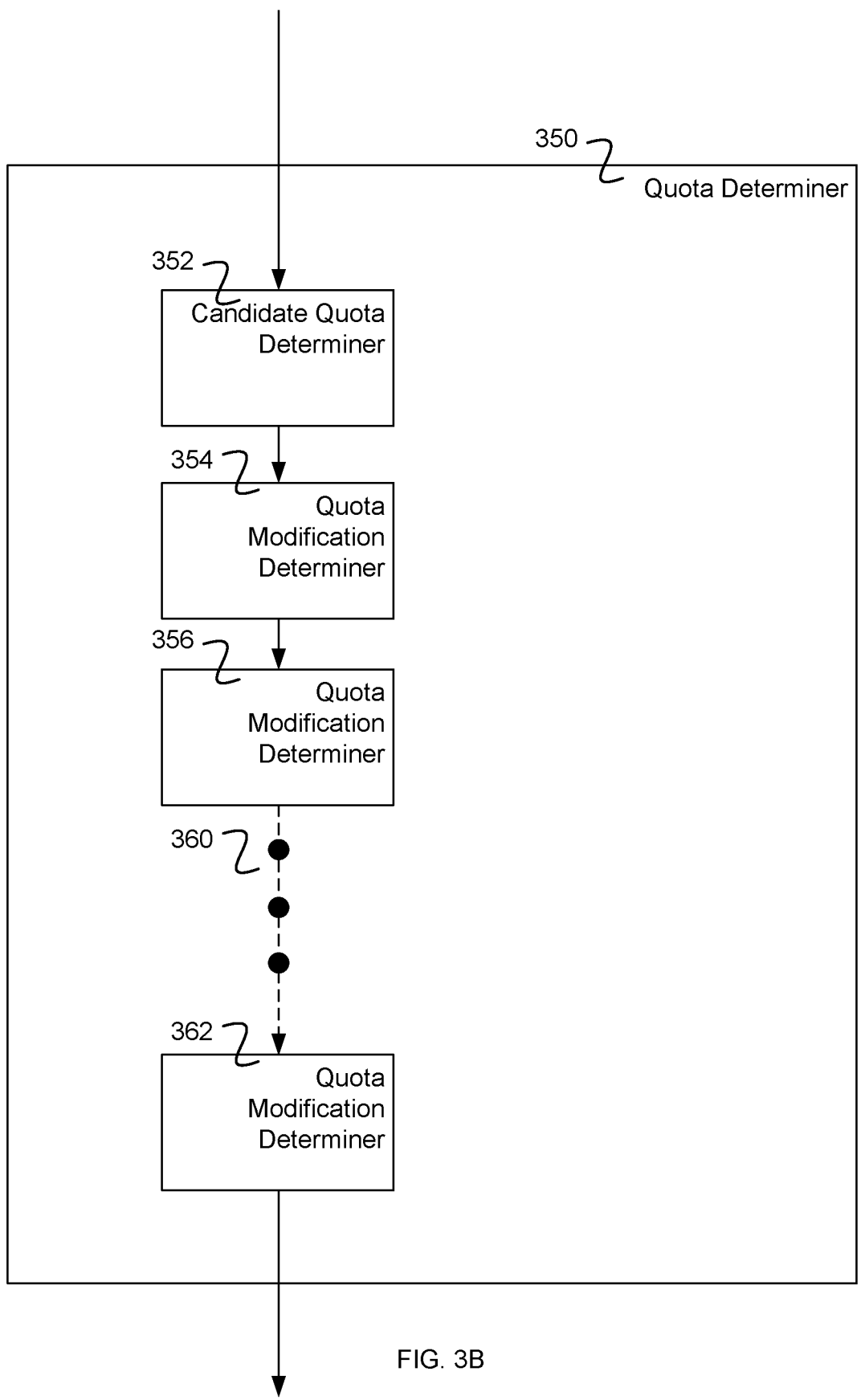
FIG. 3B is a block diagram illustrating an embodiment of a quota determiner.

FIG. 3B is a block diagram illustrating an embodiment of a quota determiner. In some embodiments, quota determiner 350 comprises quota determiner 204 of FIG. 2. In the example shown, quota determiner 350 comprises candidate quota determiner 352. Candidate quota determiner 352 determines a candidate quota value and/or a candidate validity time. In some embodiments, a candidate quota value is determined using a predetermined minimum quota value, target quota value, and maximum value. In some embodiments, a candidate quota value is determined using historical consumption velocity information. In some embodiments, a candidate quota determiner 352 is implemented using a processor. Candidate quota determiner 352 passes its values to a quota modification determiners (e.g., quota modification determiner 354). In some embodiments, candidate quota determiner 352 passes its values to other quota modification determiners indirectly (e.g., as pass through values—for example, quota modification determiner 356, quota modification determiner 362, etc.). Each quota modification determiner modifies the outputs of the quota determiner preceding it (e.g., a candidate quota determiner or a quota modification determiner) and produces a new set of outputs (e.g., a quota value, a validity time, etc.) that are passed to a next quota modification determiner or output as final quota values from the quota determiner. The final quota values are the candidate quota values as scaled and/or limited serially by the one or more quota modification determiners. In various embodiments, candidate quota determiner 352 and the one or more quota modification determiners are implemented on separate processors, combined on a single processor, or combined on any appropriate number of processors in any appropriate way.

In some embodiments, quota determiner 300 implements a candidate quota determiner and a quota modification determiner based on operating parameters. The candidate quota determiner determines minimum, target, and maximum quota amounts from configuration parameters defined or configured in the quota management system. In some embodiments the candidate quota determiner also specifies a minimum, target, and maximum quota validity time for the candidate quota. The tentative quota amount is set to the target candidate quota amount and the tentative quota validity time is set to the target quota validity time. In some embodiments, the candidate quota determiner then passes the candidate quota amounts and validity times and the tentative quota amount and validity time to the final quota assembler. The candidate quota assembler passes the candidate quota amounts and validity times and the tentative quota amount and tentative quota validity time to one or more quota modification determiners. The quota modification determiner evaluates (either through measurement or estimation) one or more operating parameters and based on the value of these operating parameters returns to the quota assembler a proposed adjustment to the tentative quota amount and tentative validity time upward or downward. The candidate quota amounts and validity times and the tentative quota amount and validity time are also passed to a second quota modification determiner if it is present. The second quota modification determiner follows the same process as the first quota modification determiner, as do any third or subsequent quota modification determiners. Once the last quota modification determiner has returned a proposed adjustment to the tentative quota amount and validity time to the final quota assembler, the final quota assembler evaluates all the proposed adjustments and calculates and applies a final adjustment to the tentative quota amount and validity time that moves the values upward or downward, but not to a value below the candidate minimum or above the candidate maximum values. The tentative quota amount and validity time are then considered final and those values are authorized and passed from the final quota assembler to the output interface. The values are then returned to the service provider by the output interface.

In some embodiments, candidate quota determiner determines the candidate/initial quota amount and validity time based on configured values. Let's assume the CQD sets the following values: a) Candidate minimum quota amount=1 Mb, b) Candidate target quota amount=5 Mb, c) Candidate maximum quota amount=20 Mb, and d) Candidate target quota validity time=60 seconds. CQD then passes the candidate quota values to the final quota assembler. The FQA passes the candidate quota values to each QMD that is present, in any order, and receives back from each QMD suggested modifications to the candidate quota values. The QRQMD is present and based on configuration settings previously described, the QRQMD determines the following values: 1) QR minimum quota lifetime=10 seconds, 2) QR target quota lifetime=30 seconds, and 3) QR maximum quota lifetime=900 seconds. Using the methods previously described, in this example the QRQMD determines that the candidate target quota amount of 5 Mb will be consumed in 10 seconds. Since the QR target quota lifetime is 30 seconds, the QRQMD sets the suggested quota amount to 15 Mb and the suggested quota validity time to 30 seconds. The QRQMD then passes these suggested values back to the FQA. In this example the workload QMD is present. Assuming a configured ideal target workload of 60, actual workload value of 80, and a response strength setting of 3, the WLQMD applies the equation previously explained and determines the quota should be scaled by a factor of 1.8. The WLQMD then multiplies the candidate target quota amount by 1.8 to get a suggested quota amount of 9 Mb. It also multiplies the candidate target quota validity time by 1.8 to get a suggested quota validity time of 108 seconds. The WLQMD then passes the suggested quota values to back to the FQA. In this example the balance threshold QMD is present. The BTQMD executes as previously described. Let's assume the BTQMD determines, based on the TBV calculated, that a balance threshold will be reached in 60 seconds. Furthermore, let's assume the BTQMD determines, based on the ABV calculated, that the current activity will consume 30 Mb of quota in those same 60 seconds. Assuming a decay strength of 2, the BTQMD determines that it should limit the suggested quota amount to no more than 15 Mb and limit the suggested quota validity time to no more than 30 seconds. Since the candidate target quota amount is 5 Mb, already smaller than the suggested limit of 15 Mb, the BTQMD sets the suggested quota amount to 5 Mb. The BTQMD also sets the suggested quota validity time to 30 seconds as calculated above. The BTQMD then passes the suggested quota values back to the FQA. The FQA has the candidate quota values and receives all the suggested quota modifications from the QMDs (e.g., A) 5 Mb & 60 seconds from CQD, b) 15 Mb & 30 seconds from QRQMD, c) 9 Mb & 108 seconds from WLQMD, d) 5 Mb & 30 seconds from BTQMD). The FQA can determine that quota is being consumed by this activity much faster than anticipated because the QRQMD increased the suggested quota amount but shortened the suggested quota validity time. The FQA can determine that the workload is above target because the WLQMD increased both the suggested quota amount and suggested validity time. The FQA can determine there is a threshold approaching because the BTQMD shortened the suggested validity time to 30 seconds. Evaluating all these factors, the FQA determines the correct quota amount is 10 Mb and the correct validity time is 20 seconds. The FQA passes these values to the output interface.

In some embodiments, quota determiner 350 implements a candidate quota determiner and a quota modification determiner based on operating parameters. The candidate quota determiner determines minimum, target, and maximum quota amounts from configuration parameters defined or configured in the quota management system. In some embodiments, the candidate quota determiner also specifies a minimum, target, and maximum quota validity time for the candidate quota. The tentative quota amount is set to the target candidate quota amount and the tentative quota validity time is set to the target quota validity time. The candidate quota determiner then passes the candidate quota amounts and validity times and the tentative quota amount and validity time to the first of one or more quota modification determiners. The quota modification determiner evaluates (either through measurement or estimation) one or more operating parameters and based on the value of these operating parameters adjusts the tentative quota amount and tentative validity time upward or downward, but not to a value below the candidate minimum or above the candidate maximum. The quota modification determiner then passes the candidate quota amounts and validity times and the tentative quota amount and validity time to a second quota modification determiner if it is present. The second quota modification determiner follows the same process as the first quota modification determiner, as do any third or subsequent quota modification determiners. Once the last quota modification determiner has adjusted the tentative quota amount and validity time, the tentative quota amount and validity time are considered final and those values are authorized and returned to the service provider via the output interface.

In some embodiments, quota determiner 350 implements a candidate quota determiner and a quota modification determiner based on operating parameters and ideal values. The candidate quota determiner determines minimum, target, and maximum quota amounts from configuration parameters defined or configured in the quota management system. In some embodiments, the candidate quota determiner also specifies a minimum, target, and maximum quota validity time for the candidate quota. The tentative quota amount is set to the target candidate quota amount and the tentative quota validity time is set to the target quota validity time. The candidate quota determiner then passes the candidate quota amounts and validity times and the tentative quota amount and validity time to the first of one or more quota modification determiners. The quota modification determiner compares the values of one or more operating parameters (as determined either by measurement or estimation) to ideal values for these operating parameters that are defined or configured in the system. Based on the difference between the values of these operating parameters and their ideal values, the quota modification determiner adjusts the tentative quota amount and tentative validity time upward or downward in an attempt to cause the operating parameter values to subsequently change toward their ideal values, but not to a value below the candidate minimum or above the candidate maximum. In some embodiments, the ideal value for an operating parameter comprises one or more of the following: a minimum ideal value, a target ideal value, a maximum ideal value, or any combination thereof. The quota modification determiner adjusts the tentative quota amount and validity time to attempt to subsequently move the value of the operating parameter to match the target ideal value, but also adjusts the target quota amount and validity time to ensure the value of the operating parameter does not fall below the ideal minimum value or above the ideal maximum value. The quota modification determiner then passes the candidate quota amounts and validity times and the tentative quota amount and validity time to a second quota modification determiner if it is present. The second quota modification determiner follows the same process as the first quota modification determiner, as do any third or subsequent quota modification determiners. Once the last quota modification determiner has adjusted the tentative quota amount and validity time, the tentative quota amount and validity time are considered final and those values are authorized and returned to the service provider via the output interface. In some embodiments, quota determiner 300 implements a candidate quota determiner and a quota modification determiner based on operating parameters and ideal values similar to above, but instead of serially processing the quota values quota determiner 300 includes a final quota assembler that determines a final quota value based on the one or more modified values produced by one or more quota modification determiners after receiving the candidate quota values.

In some embodiments, quota determiner 350 implements a candidate quota determiner and a quota modification determiner based on operating parameters, ideal values, and a lookup table. The candidate quota determiner determines minimum, target, and maximum quota amounts from configuration parameters defined or configured in the quota management system. In some embodiments, the candidate quota determiner also specifies a minimum, target, and maximum quota validity time for the candidate quota. The tentative quota amount is set to the target candidate quota amount and the tentative quota validity time is set to the target quota validity time. The candidate quota determiner then passes the candidate quota amounts and validity times and the tentative quota amount and validity time to the first of one or more quota modification determiners. The quota modification determiner compares the values of one or more operating parameters (as determined either by measurement or estimation) to ideal values for these operating parameters that are defined or configured in the system. Based on the set of operating parameter values and their ideal values, on the difference between the values of these operating parameters and their ideal values, or any combination thereof, the quota modification determiner indexes into a lookup table and locates the entry in the lookup table that is most relevant to the situation. The entry in the lookup table contains either new values for the tentative quota amount and validity time, or an adjustment to be made to the existing values of the tentative quota amount and validity time. The quota modification determiner then sets or adjusts the tentative quota amount and tentative validity time upward or downward based on the entry in the lookup table in an attempt to cause the operating parameter values to subsequently change toward their ideal values, but not to a value below the candidate minimum or above the candidate maximum. The quota modification determiner then passes the candidate quota amounts and validity times and the tentative quota amount and validity time to a second quota modification determiner if it is present. The second quota modification determiner follows the same process as the first quota modification determiner, as do any third or subsequent quota modification determiners. Once the last quota modification determiner has adjusted the tentative quota amount and validity time, the tentative quota amount and validity time are considered final and those values are authorized and returned to the service provider via the output interface. In some embodiments, quota determiner 300 implements a candidate quota determiner and a quota modification determiner based on operating parameters, ideal values, and a lookup table similar to above, but instead of serially processing the quota values quota determiner 300 includes a final quota assembler that determines a final quota value based on the one or modified values produced by one or more quota modification determiners after receiving the candidate quota values.

In some embodiments, quota determiner 350 implements a candidate quota determiner and a quota modification determiner (QMD) based on operating parameters, ideal values, and a feedback equation. The candidate quota determiner determines minimum, target, and maximum quota amounts from configuration parameters defined or configured in the quota management system. In some embodiments, the candidate quota determiner also specifies a minimum, target, and maximum quota validity time for the candidate quota. The tentative quota amount is set to the target candidate quota amount and the tentative quota validity time is set to the target quota validity time. The candidate quota determiner then passes the candidate quota amounts and validity times and the tentative quota amount and validity time to the first of one or more quota modification determiners. The quota modification determiner compares the values of one or more operating parameters (as determined either by measurement or estimation) to ideal values for these operating parameters that are defined or configured in the system. The differences between the values of these operating parameters and their ideal values are used as input to a feedback equation (e.g. an exponential response curve equation or a geometric decay curve equation) and the result of the feedback equation is an adjustment to the tentative quota amount and validity time. The quota modification determiner then adjusts the tentative quota amount and tentative validity time upward or downward based on the based on the result of the feedback equation in an attempt to cause the operating parameter values to subsequently change toward their ideal values, but not to a value below the candidate minimum or above the candidate maximum. The quota modification determiner then passes the candidate quota amounts and validity times and the tentative quota amount and validity time to a second quota modification determiner if it is present. The second quota modification determiner follows the same process as the first quota modification determiner, as do any third or subsequent quota modification determiners. Once the last quota modification determiner has adjusted the tentative quota amount and validity time, the tentative quota amount and validity time are considered final and those values are authorized and returned to the service provider via the output interface. In some embodiments, quota determiner 300 implements a candidate quota determiner and a quota modification determiner based on operating parameters, ideal values, and a feedback equation similar to above, but instead of serially processing the quota values quota determiner 300 includes a final quota assembler that determines a final quota value based on the one or modified values produced by one or more quota modification determiners after receiving the candidate quota values.

In some embodiments, an example serial workflow for quota determination is disclosed. In this example, a candidate quota determiner determines the candidate quota amount and validity time based on configured values. In this example, the candidate quota determiner (CQD) sets the following values:

Candidate minimum quota amount=1 Mb
Candidate target quota amount=5 Mb
Candidate maximum quota amount=20 Mb
Candidate target quota validity time=60 seconds CQD then sets the tentative quota amount and tentative quota validity time to the candidate target values (5 Mb and 60 seconds). CQD then passes the candidate and tentative quota values to the first quota modification determiner. In the serial workflow model, it is important that quota modification determiners are executed in the correct order (e.g., intended goal QMDs, quota-increasing QMDs, and quota-decreasing QMDs. The first QMD that is executed is the quota rate QMD, since that QMD effectively adjusts the tentative quota to match the "intended goal" of the candidate quota values based on how quickly the activity is actually consuming quota, and thus may adjust the quota amount upward or downward. Next, the QMDs that are designed to increase the quota amount (e.g., workload QMD, etc.) are run, then finally the QMDs that are designed to decrease the quota amount (e.g., balance accuracy QMD, balance sharing QMD, balance threshold QMD, etc.) are run. This ordering allows the quota decreasing QMDs to still reduce the quota amount down to the candidate minimum quota amount where utmost accuracy is required. Running the quota-increasing QMDs after the quota-decreasing QMDs are already finished may result in a loss of accuracy due to the quota amount being increased as the last step to an amount above the candidate minimum quota amount. In one example, the QRQMD is present and is configured to be executed first. In the example, based on configuration settings described below, the QRQMD determines the following values:
 a. QR minimum quota lifetime=10 seconds
 b. QR target quota lifetime=30 seconds
 c. QR maximum quota lifetime=900 seconds Using the methods described below, in this example the QRQMD determines that the current input quota amount of 5 Mb will likely be consumed in 10 seconds. Since the QR target quota lifetime is 30 seconds, the QRQMD sets the tentative quota amount to 15 Mb and the tentative quota validity time to 30 seconds. The QRQMD then passes the candidate and modified tentative quota values to the next QMD in the chain. In this example, the workload QMD is present and configured to run next. Assuming a configured ideal target workload of 60, actual workload value of 80, and a response strength setting of 3, the workload QMD (WLQMD) applies the logic described below and determines the quota should be scaled by a factor of 1.8. The WLQMD then tries to multiple the input quota amount of 15 Mb by the scale factor of 1.8, but the result exceeds the candidate maximum quota amount of 20 Mb. As a result, the WLQMD sets the tentative quota amount to 20 Mb. Because the input quota amount was effectively scaled by a factor of 1.33, the WLQMD then scales the input quota validity time equally to a value of 40 seconds. The WLQMD then passes the candidate and modified tentative quota values to the next QMD in the chain. In this example, the balance threshold QMD (BTQMD) is present and configured to run next. The BTQMD determines based on the total balance velocity (TBV) calculated (as described in detail below), that a balance threshold will be reached in 60 seconds. Furthermore, in this example the BTQMD determines, based on the activity balance velocity (ABV) calculated, that the current activity will consume 30 Mb of quota in those same 60 seconds. Applying a configured decay strength of 2, the BTQMD determines that the modified tentative quota amount should be 15 Mb and the modified tentative quota validity time should be 30 seconds. Since these values are between the associated minimum and maximum values, the BTQMD sets the tentative quota values accordingly. The BTQMD then passes the candidate and modified tentative quota values to the next QMD in the chain. Assuming there are no more QMDs configured in the chain, the candidate and modified tentative quota values are passed to the output interface. The output interface declares the modified tentative quota values to be final, completes balance reservations and other tasks associated with finalizing the quota authorized, and returns these values to the service provider.

In some embodiments, an example parallel workflow for quota determination is disclosed. In this example, a candidate or initial quota determiner determines the candidate or initial quota amount and validity time based on configured values as previously described. The candidate quota determiner (CQD) sets the following values:
 Candidate minimum quota amount=1 Mb
 Candidate target quota amount=5 Mb
 Candidate maximum quota amount=20 Mb
 Candidate target quota validity time=60 seconds CQD then passes the candidate quota values to the final quota assembler (FQA). The candidate quota values are passed to each QMD that is present, in any order, and the FQA receives back from each QMD modifications to the candidate quota values. In this example, the QRQMD is present. Based on configuration settings, the QRQMD determines the following:
 QR minimum quota lifetime=10 seconds
 QR target quota lifetime=30 seconds
 QR maximum quota lifetime=900 seconds The QRQMD determines that the candidate target quota amount of 5 Mb will likely be consumed in 10 seconds. Since the QR target quota lifetime is 30 seconds, the QRQMD sets the modified quota amount to 15 Mb and the modified quota validity time to 30 seconds. The QRQMD then passes these modified values back to the FQA. In this example, the workload QMD (WLQMD) is present. Assuming a configured ideal target workload of 60, actual workload value of 80, and a response strength setting of 3, the WLQMD applies the equation explained below and determines the quota should be scaled by a factor of 1.8. The WLQMD then multiplies the candidate target quota amount by 1.8 to get a modified quota amount of 9 Mb. It also multiplies the candidate target quota validity time by 1.8 to get a modified quota validity time of 108 seconds. The WLQMD then passes the modified quota values to back to the FQA. In this example, the balance threshold QMD (BTQMD) is present. The BTQMD determines, based on the TBV calculated, that a balance threshold will be reached in 60 seconds. Furthermore, in this example the BTQMD determines, based on the ABV calculated, that the current activity will likely consume 30 Mb of quota in those same 60 seconds. Applying a configured decay strength of 2, the BTQMD determines that it should limit the modified quota amount to no more than 15 Mb and limit the modified quota validity time to no more than 30 seconds. Since the candidate target quota amount is 5 Mb, already smaller than the modified limit of 15 Mb, the BTQMD sets the modified quota amount to 5 Mb. The BTQMD also sets the modified quota validity time to 30 seconds as calculated above. The BTQMD then passes the modified quota values back to the FQA. Once all the QMDs have provided modified quota values to the FQA, the FQA uses the modified values to derive final quota values. In various embodiments, the method used to calculate the derived quota values involves mathematically combining the various modified quota values, applying weightings to each QMD and combining the modified values with these weightings, or any other reasonable method to derive a single set of quota values from the modified values. The FQA declares the derived quota values to be final, completes balance reservations and other tasks associated with finalizing the quota authorized, and passes the final quota values to the output interface which returns these values to the service provider.

Figure 4:
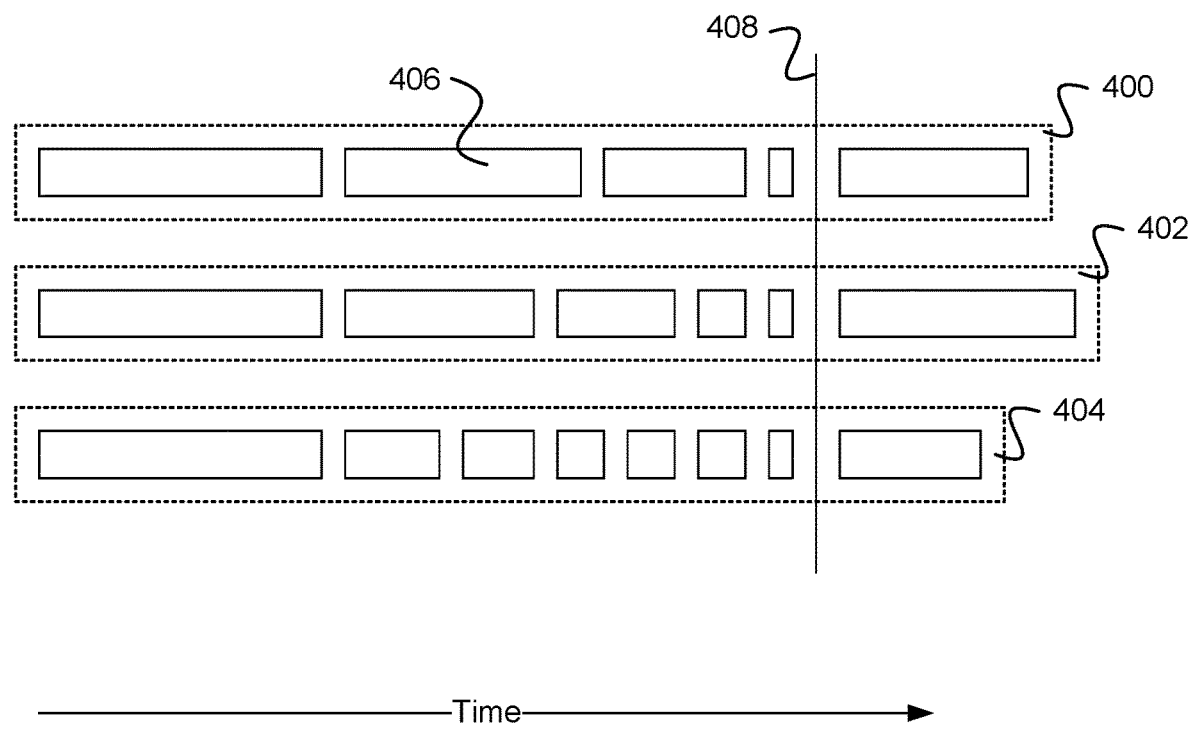
FIG. 4 is a diagram illustrating an embodiment of quota periods.

FIG. 4 is a diagram illustrating an embodiment of quota periods. In some embodiments, the quota periods comprise quota periods for connectivity devices (e.g., connectivity device 102 of FIG. 1). In some embodiments, the quota periods comprise quota periods determined by a quota management system (e.g., quota management system 108 of FIG. 1). In the example shown, three quota sequences are shown. Quota sequence 400 comprises a quota sequence associated with a first connectivity device, quota sequence 402 comprises a quota sequence associated with a second connectivity device, and quota sequence 404 comprises a quota sequence associated with a third connectivity device. Each quota sequence comprises a set of quota periods (e.g., quota period 406). A quota period signifies an amount of usage for accessing service via a service provider allotted to the associated connectivity device by the quota management system. In some embodiments, a quota period also signifies a validity time for the amount of usage allotted, after which the usage allotment (quota) is no longer valid. In various embodiments, a quota period comprises a time of voice access, an amount of data access, an amount of data access with a validity time, a number of text messages, a number of text messages with a validity time, or any other appropriate quota period quantity. When a quota period expires due to the validity time being reached or the allotted usage being fully used, the service provider, on behalf of the associated connectivity device, reports the amount of actual usage and requests a new quota, which is determined by the quota management system and provided to the connectivity device by the service provider. In the example shown, quota sequence 400, quota sequence 402, and quota sequence 404 are associated with a single account or a set of accounts that share an account balance (e.g., the associated connectivity devices are part of a family account, are part of a business account, etc.). In some embodiments, an account balance has an associated threshold. In some embodiments, a threshold comprises a point in an account balance where an action should be taken. For any balance threshold, there is a point in time where impacts of the cost of all usage associated with the balance will cause the balance to exactly equal the threshold value (e.g. threshold reaches time 408). In various embodiments, a threshold action comprises disallowing service, changing the quality of service, changing a charging rate, sending a message (e.g., indicating the account balance has crossed the threshold), or any other appropriate action. In some embodiments, a quota period should not cross a threshold (e.g., so that the threshold action can take place at the threshold value precisely). In some embodiments, a quota period can cross a threshold but the time or amount by which it crosses should be minimized (e.g., so that the threshold action can take place as close to the threshold as is practical). In the example shown, quota periods are assigned (e.g., by the quota management system) so they get smaller as the threshold is approached. In some embodiments, the total quota amount assigned among all connectivity devices associated with the same account is limited in order to limit total account balance uncertainty (e.g., when quota is assigned, an unknown amount of quota (and therefore account balance) is going to be used by the connectivity device, up to the total amount of quota; the total account balance uncertainty is the cost of the total amount of quota assigned to all devices associated with the account balance).

Figure 5:
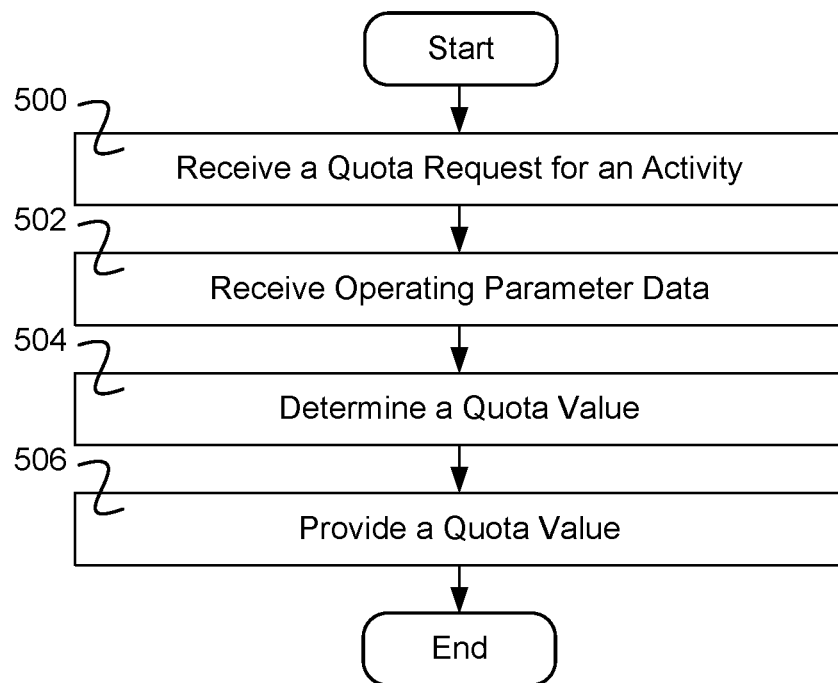
FIG. 5 is a flow diagram illustrating an embodiment of a process for providing a quota amount.

FIG. 5 is a flow diagram illustrating an embodiment of a process for providing a quota amount. In some embodiments, the process of FIG. 5 is executed by a quota management system (e.g., quota management system 108 of FIG. 1). In the example shown, in 500, a quota request for an activity is received. For example, a quota request is received for a user to use a service provided by a service provider associated with a connectivity device. In various embodiments, the activity comprises a voice connection, a low bandwidth data connection (e.g., reading email), a high bandwidth data connection (e.g., watching video), or any other appropriate activity. In 502, operating parameter data is received. For example, operating parameter data is received associated with the user and/or the service provider. In various embodiments, operating parameter data comprises one or more of the following: quota consumption velocity data, account balance data, threshold data, reservation data, system workload data, or any other appropriate data. In 504, a quota value is determined. For example, a quota amount and/or a validity time are determined dynamically based at least in part on received operating parameter data). In 506, the quota value is provided. For example, the quota value is provided to enable the connectivity device to perform the activity (e.g., providing a quota amount and/or a validity time for a service provider to authorize the connectivity device perform the activity using one or more services provided by the service provider—for example, data connectivity over a cellular network is provided to a mobile phone for an amount of data over a period of time). In some embodiments, providing a quota amount comprises making a corresponding reservation on an account balance (e.g., on an account balance stored by the quota management system or service provider).

Figure 6:
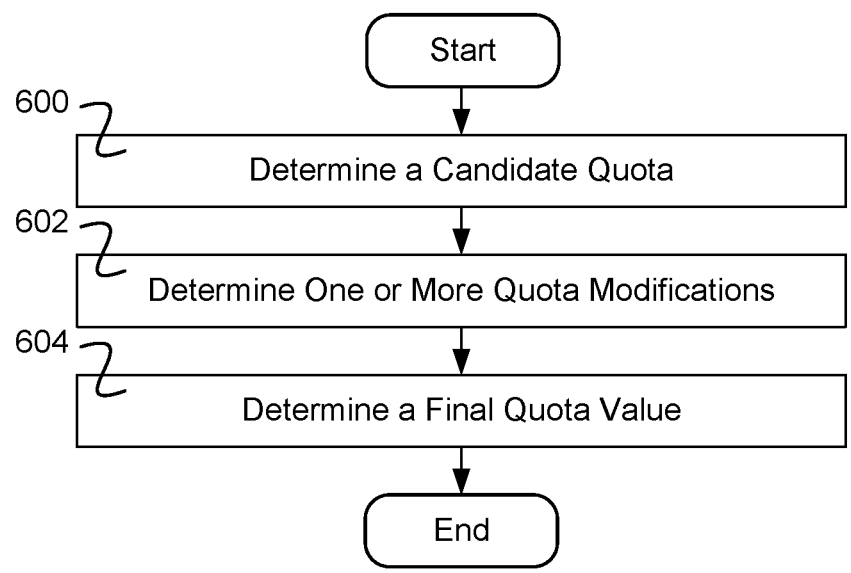
FIG. 6 is a flow diagram illustrating an embodiment of a process for determining a quota value.

FIG. 6 is a flow diagram illustrating an embodiment of a process for determining a quota value. In some embodiments, the process of FIG. 6 is used to implement 504 of FIG. 5. In the example shown, in 600 a candidate quota value is determined. For example, a minimum, target, and maximum quota amounts are determined from configuration parameters defined or configured in the quota management system. In some embodiments, a minimum, target, and maximum quota validity time for the candidate quota are also determined from configuration parameters defined or configured in the quota management system. The tentative quota amount is set to the target candidate quota amount and the tentative quota validity time is set to the target quota validity time. In 602, one or more quota modifications are determined. For example, input amounts are input to a process that adjusts (e.g., scales, uses an equation, uses a lookup table, etc.) the tentative target amounts and generates modified amounts. In some embodiments, input amounts are candidate quota value(s). In some embodiments, input amounts are output values (modified amounts) from a prior modification. In some embodiments, input amounts are candidate quota value(s) and output values (modified amounts) from a prior modification. In 604, a final quota value is determined. For example, the final quota is determined based on the candidate quota value(s) and the modification(s) to an input quota value. In some embodiments, the final quota value is assembled based on one or more modifications to input value(s). In some embodiments, the final quota value is a final output where input value(s) is/are modified by a number of modification determiners one after another in series to in the end produce a final quota output.

Figure 7:
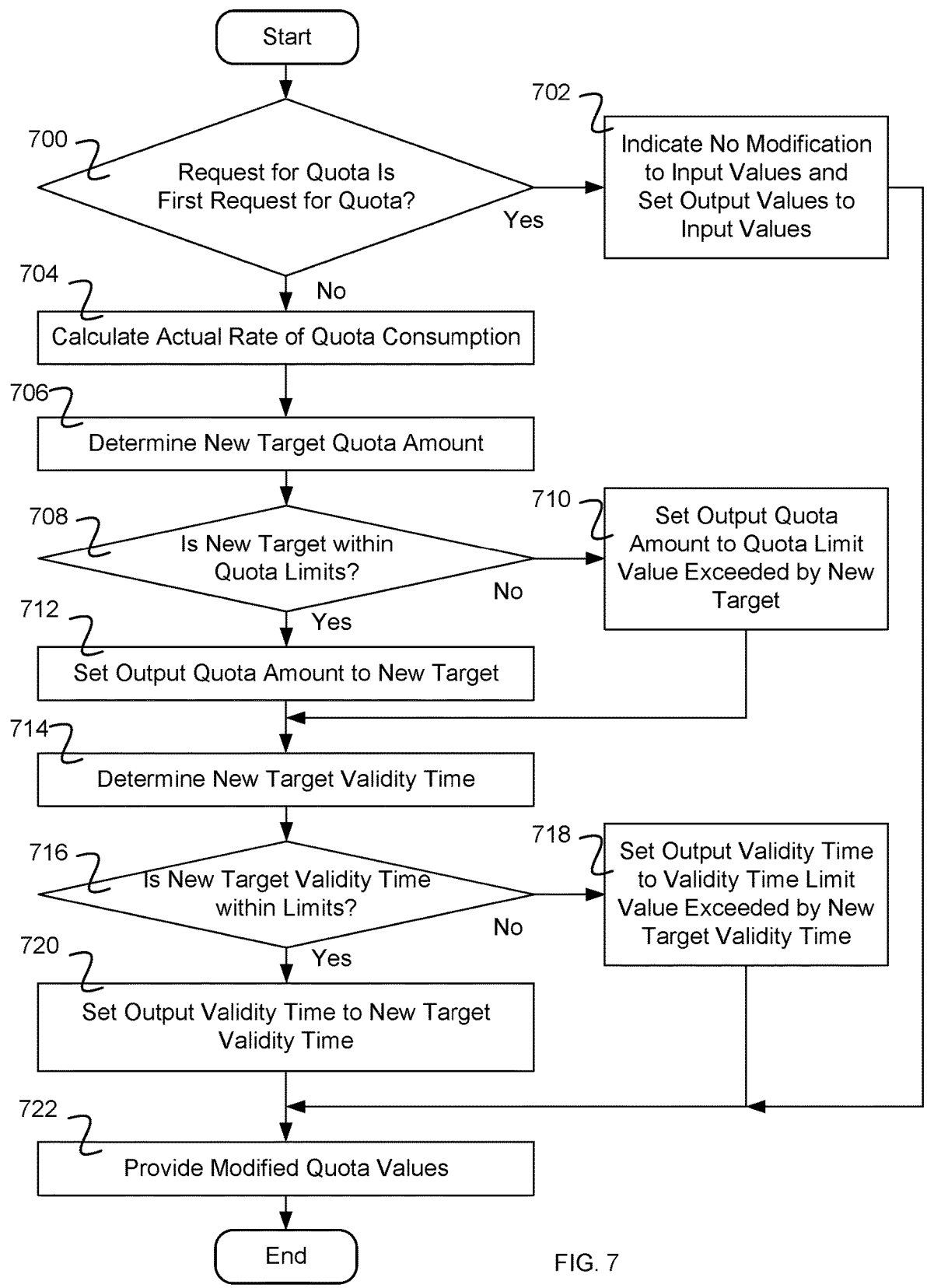
FIG. 7 is a flow diagram illustrating an embodiment of a process for a quota modification determiner based on a rate at which quota is consumed.

FIG. 7 is a flow diagram illustrating an embodiment of a process for a quota modification determiner based on a rate at which quota is consumed. In some embodiments, the process of FIG. 7 is used to implement a quota modification of the one or more quota modifications of 602 of FIG. 6. In the example shown, a quota rate quota modification determiner (QRQMD) determines modifications to the tentative quota amount and validity time based on the rate at which quota is being consumed by the activity being authorized (QR). In some embodiments, ideal values (IV) are defined or configured in the quota management system for a minimum quota amount, a target quota amount, a maximum quota amount and target quota lifetime, or any combination thereof. In various embodiments, the target quota lifetime is expressed as the amount of quota expected to be consumed over a unit of time (e.g. megabytes/second) or as the expected time it will take to consume the target quota amount ideal value (e.g. 30 seconds). In various embodiments, some or all of these ideal values are configurable per type of activity, per network type, or per any other appropriate circumstance that would typically affect the expected rate of quota consumption. The output interface stores the final quota amount that is being authorized and the exact time it is authorized before sending the final quota amount and validity time to the service provider. This data is accessible by the QRQMD. In 700, it is determined whether the request for quota is a first request for quota. In the event that the request for quota is the first request for quota, in 702 it is indicated that no modifications to input values are to be made and the input values are provided as output values. For example, during the initial authorization request for an activity, the QRQMD receives the candidate quota and tentative quota values from the candidate quota determiner or the prior quota modification determiner (depends on which workflow and ordering). Because the rate of consumption is not known during the initial quota authorization, the QRQMD does not change the input values. For example, the initial quota determination the candidate quota determiner sets the tentative quota amount to the IV target quota amount and sets the tentative quota validity time to the IV target quota lifetime and these are passed from the input to the output. In the event that the request for quota is not the first request for quota, in 704 the actual rate of quota consumption is calculated. For example, the QRQMD receives the candidate quota and tentative quota values from the candidate quota determiner or the prior quota modification determiner (depends on which workflow and ordering). The QRQMD also receives the actual used quota amount in the same message or has access to this data stored within the quota management system. The QRQMD calculates the actual rate of quota consumption for the activity by dividing the actual quota amount used by the time period that has elapsed since the previous quota was authorized (e.g. if 10 Mb was authorized 30 seconds ago, and 6 Mb of that quota was actually used, then the actual consumption rate is 6 Mb over 30 seconds or 0.2 Mb/second). In some embodiments, the QRQMD calculates the actual rate of quota consumption using a weighted average of the consumption rates from the past N authorizations rather than just the last authorization, where N may be any integer larger than 1. In various embodiments, the weighting decays the farther back in time the authorization takes place, the weighting stays level, the steps lower the farther back in time the authorization takes place, or any other appropriate weighting. In 706, a new target quota amount is determined. For example, the QRQMD multiplies the actual quota consumption rate by the input validity time (e.g., the IV target quota validity time) to determine a new target quota amount (e.g., if actual consumption rate is 0.2 Mb/second and the input validity time is 30 seconds, new target quota amount would be 6 Mb). In 708, it is determined whether the new target quota is within the quota limits. In the event that the new target quota is not within the quota limits, in 710 the output quota amount is set to the quota limit value that was exceeded by the new target and control passes to 714. For example, in the event that the new target quota amount is larger than the IV maximum quota amount or the candidate maximum quota amount, the new target quota amount is set to the appropriate maximum quota amount. Or, for example, in the event that the new target quota amount is smaller than the IV minimum quota amount or the candidate minimum quota amount, the new target quota amount is set to the appropriate minimum quota amount. In 712, the output quota amount is set to the new target and control passes to 714. In 714, a new target validity time is determined. For example, the input validity time is scaled similar to the quota amount. In 716, it is determined whether the new target validity time within limits. In the event that the new target validity time is not within limits, then in 718 the output validity time is set to the validity time limit value exceeded by the new target validity time and control passes to 722. In the event that the new target validity is within limits, then in 720 the output validity time is set to the new target validity time and control passes to 722. In 722, the modified quota values are provided, and the process ends.

In some embodiments, the process for a frequency of reauthorization requests quota modification determiner (RRQMD) is similar to a QRQMD except that the actual rate of reauthorization requests is calculated (e.g., as actual rate of quota consumption is calculated in 704 of FIG. 7).

Figure 8:
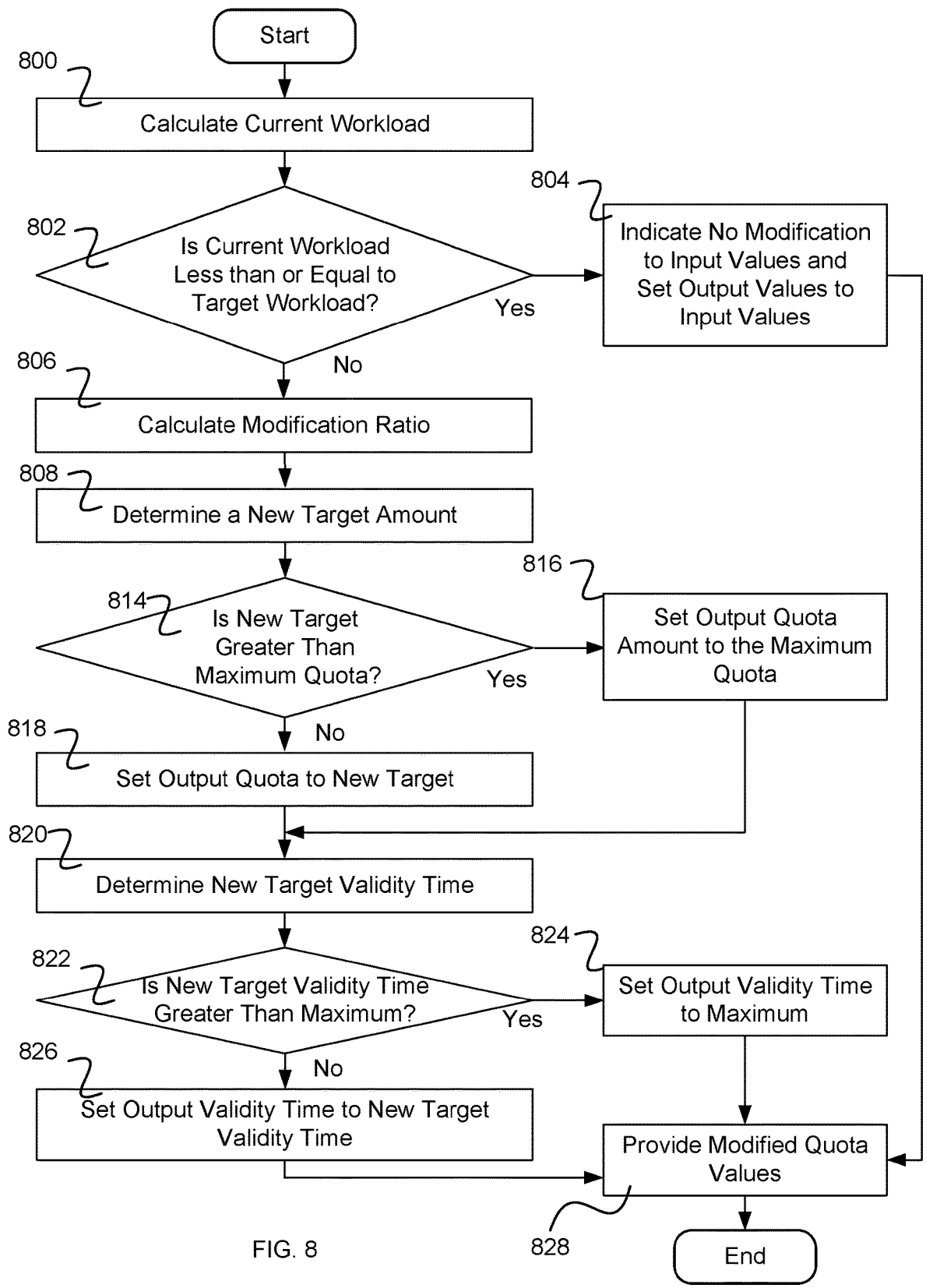
FIG. 8 is a flow diagram illustrating an embodiment of a process for a quota modification determiner based on a system workload.

FIG. 8 is a flow diagram illustrating an embodiment of a process for a quota modification determiner based on a system workload. In some embodiments, the process of FIG. 8 is used to implement a quota modification of the one or more quota modifications of 602 of FIG. 6. In some embodiments, a workload quota modification determiner (WLQMD) determines modifications to the input quota amount and validity time based on a measurement of the workload of the quota management system. In various embodiments, the workload of the quota management system comprises one or more of the following: a measurement of CPU utilization, network utilization, storage system utilization, memory utilization, the rate of requests being received by the system, the latency of responses to requests being received by the system, or any other method commonly used to determine the workload of a system. In some embodiments, the workload of the system is defined as a number between 0 and 100, with the actual measured workload being normalized into this range. In some embodiments, the number of requests being received per second is the metric measured to calculate the workload, and a rate of requests (e.g. 5000/second) is defined as a workload of 100 and a workload ratio is calculated by dividing 100 by this rate of requests (in this example, 100/5000=0.02). The workload value is then calculated by multiplying the measured rate of requests by this ratio (e.g. a request rate of 3000/second would equal a workload value of 60). In some embodiments, an ideal value is defined or configured in the quota management system for a target workload value. In some embodiments, the WLQMD utilizes an exponential response curve equation to calculate a modification ratio to the input quota amount and validity time. In some embodiments, a response strength value (RS) is defined or configured in the system, representing the exponent to be used in the equation. The response strength may be any integer 1 or larger (e.g. 1, 2, 4, 11), with a larger response strength causing a steeper response curve and therefore a stronger modification ratio when the measured workload exceeds the IV target workload.

In the example shown in FIG. 8, in 800 a current workload is calculated. For example, during an authorization request for an activity, the WLQMD receives the candidate quota and input quota values from the candidate quota determiner or the prior quota modification determiner (depends on which workflow and ordering). The WLQMD then calculates the current workload of the system (CWL)—in our example this means examining a variable in the system that tracks how many requests per second are being received (e.g. 3000) and multiplying it by the workload ratio (e.g. CWL=3000×0.02=60). In 802, it is determined whether the current workload is less than or equal to a target workload. For example, the WLQMD then compares the CWL to the ideal value target workload (TWL). In the event that the current workload is less than or equal to the target workload, then in 804 the output quota values are set to the input quota values. For example, in the event that the CWL is less than or equal to the TWL, the WLQMD does not modify the input quota amount or validity time and simply copies the input values to the output values. In the event that the current work load is greater than the target workload, then in 806 a modification ratio is calculated. For example, in the event that the CWL is greater than the TWL, then the WLQMD uses this equation to calculate a modification ratio (MR): MR=1+((((CWL−TWL)/10)^RS)/10). In various embodiments, other equations may be used to calculate the MR based on the difference between CWL and TWL. In 808, a new target quota amount is determined. For example, the new target quota is determined by multiplying the input quota amount by MR. In 814, it is determined whether the new target is greater than a maximum quota. In the event that the new quota amount is greater than maximum quota, in 816 the output quota amount is set equal to the maximum quota (e.g., candidate maximum quota amount) and control passes to 820. In the event that the new target is not greater than maximum quota, the output quota amount is set to the new target. In 820, a new target validity time is determined. For example, the input validity time is multiplied by MR. In 822, it is determined whether the new target validity time is greater than the maximum. In the event that the new target validity time is greater than the maximum, in 824 the output validity time is set to the maximum and control passes to 828. In the event that the new target validity time is not greater than the maximum, the output validity time is set to new target validity time and control passes to 828. In 828, the modified output quota values are provided. For example, the output quota amount and the output validity time are provided as the output of the quota management system.

In some embodiments, a workload quota modification determiner (WLQMD) may utilize a lookup table to determine a quota modification based on the estimated or measured workload value. The lookup table in the example contains the following data: For example:

| Workload Value | Quota scaling coefficient |
|---|---|
| 0-50 | 1.0 |
| 50-60 | 1.2 |
| 60-70 | 1.5 |
| 70-80 | 2.0 |
| 80-85 | 4.0 |
| 85-90 | 6.0 |
| 90-95 | 8.0 |
| 95-100 | 10.0 |

The WLQMD locates the row in the LT that is applicable based on the current workload value. The WLQMD then multiplies the input quota amount and input validity time by the scaling coefficient in that row of the LT. The WLQMD then compares the resulting quota amount and validity time to an minimum or maximum values that are configured or in the candidate quota, and limits its modifications to any of these minimums or maximums as appropriate.

Figure 9:
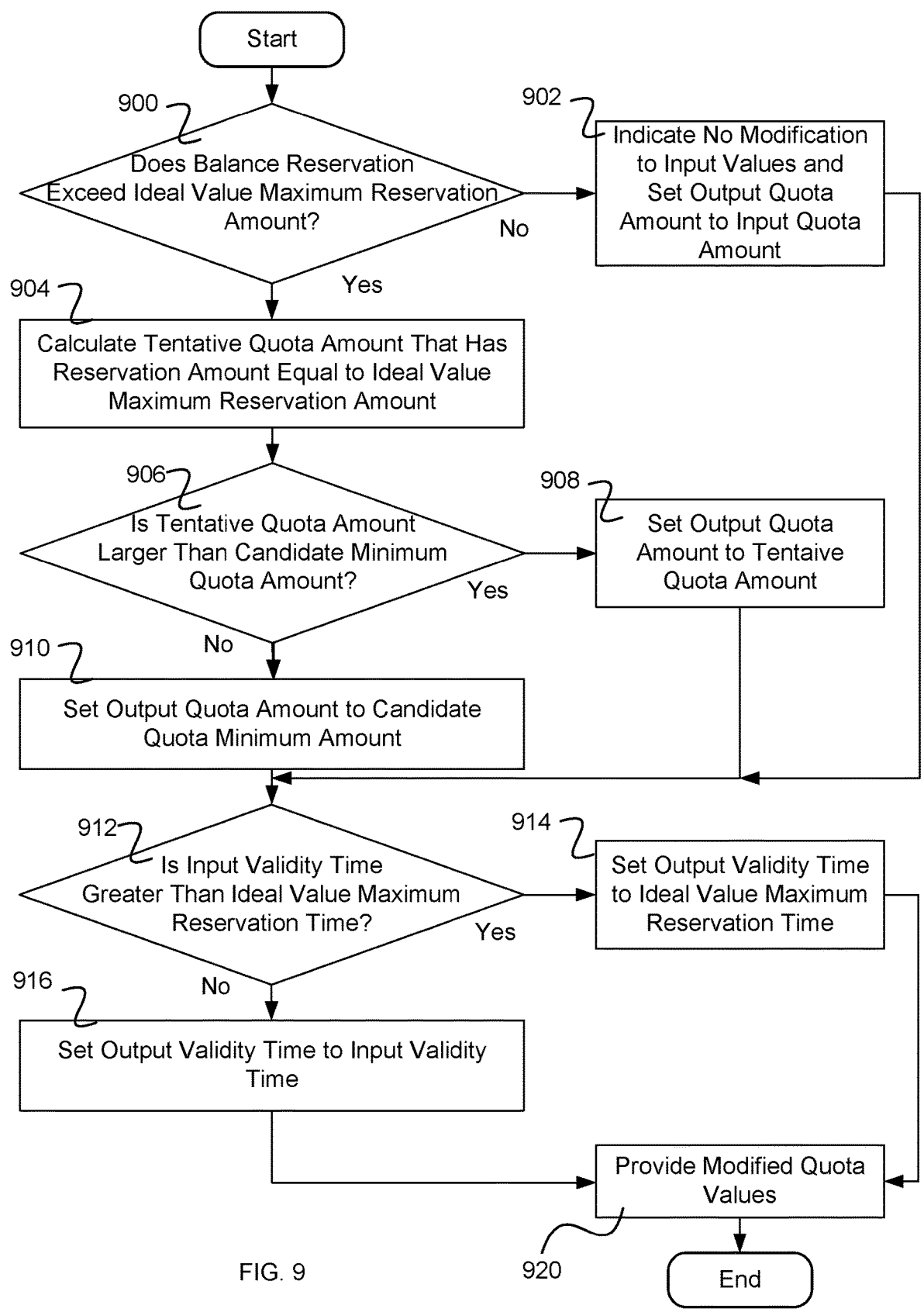
FIG. 9 is a flow diagram illustrating an embodiment of a process for a quota modification determiner based on a rate at which a balance is being impacted as quota is consumed by the activity being authorized.

FIG. 9 is a flow diagram illustrating an embodiment of a process for a quota modification determiner based on a rate at which a balance is being impacted as quota is consumed by the activity being authorized. In some embodiments, the process of FIG. 9 is used to implement a quota modification of the one or more quota modifications of 602 of FIG. 6. In some embodiments, a balance rate quota modification determiner (BRQMD) determines modifications to the input quota amount and validity time based on the rate at which a balance is being impacted as quota is consumed by the activity being authorized. In some embodiments, an ideal value maximum reservation amount (IVMRA) is defined or configured in the system. In some embodiments, an ideal value maximum reservation time (IVMRT) is defined or configured in the system. In various embodiments, IVMRA and IVMRT values may be defined or configured for each balance or class of balance, and different values may be defined or configured per type of activity, per network type, per commercial offer, or per any other appropriate circumstance that would typically affect the expected rate of a balance being impacted. In the example shown, in 900 it is determined whether a balance reservation exceeds an ideal value maximum reservation amount. For example, the BRQMD receives an ideal value maximum reservation amount (IVMRA), calculates a balance reservation amount (BR), and determines whether BR is greater than IVMRA. During an authorization request for an activity, the BRQMD receives the candidate quota and input quota values from the candidate quota determiner or the prior quota modification determiner (depends on which workflow and ordering). The BRQMD executes the rating logic using the tariff plan details that apply to that activity and tracks what balance reservations are necessary based on authorizing the tentative quota amount. In 902, in the event that the balance reservation does not exceed the ideal maximum reservation amount, no modification to input quota amount is indicated and the output quota amount is set to the input quota amount, and control passes to 912. For example, authorizing the input quota amount does not require any balance reservations that exceed the associated IVMRA, and so the BRQMD does not modify the input quota amount. In the event that a balance reservation does exceed the ideal maximum reservation amount, in 904 a tentative quota amount is calculated that has the reservation amount equal the ideal maximum reservation amount. For example, in the event that authorizing the input quota amount does require a balance reservation that would exceed the associated IVMRA, the BRQMD calculates how much quota can be authorized such that the balance reservation equals the IVMRA rather than exceeds it. In 906, it is determined whether the tentative quota amount is larger than the candidate minimum quota amount. In the event that the tentative quota amount is larger than the candidate amount, then in 908 the output quota amount is set to the tentative quota and control passes to 912. In the event that the tentative quota is not larger than the candidate quota minimum amount, then in 910 the output quota is set to the candidate quota minimum amount and control passes to 912. In 912, it is determined whether the input validity time is greater than the ideal value maximum reservation time. In the event that the input validity time is greater than the ideal value maximum reservation time, then in 914 the output validity time is set to the ideal value maximum reservation time and control passes to 920. In the event that the input validity time is not greater than the ideal value maximum reservation time, then in 916 the output validity time is set to the input validity time and control passes to 920. For example, the BRQMD compares the input quota validity time to the associated IVMRT values for any balances that require reservations to authorize the quota. If any of the IVMRT values are smaller than the input quota validity time, the output quota validity time is set to this smaller value, otherwise the output validity time is set to the input validity time. In 920, the modified output quota values are provided. For example, the output quota amount and the output validity time are provided as the output of the quota management system.

Figure 10:
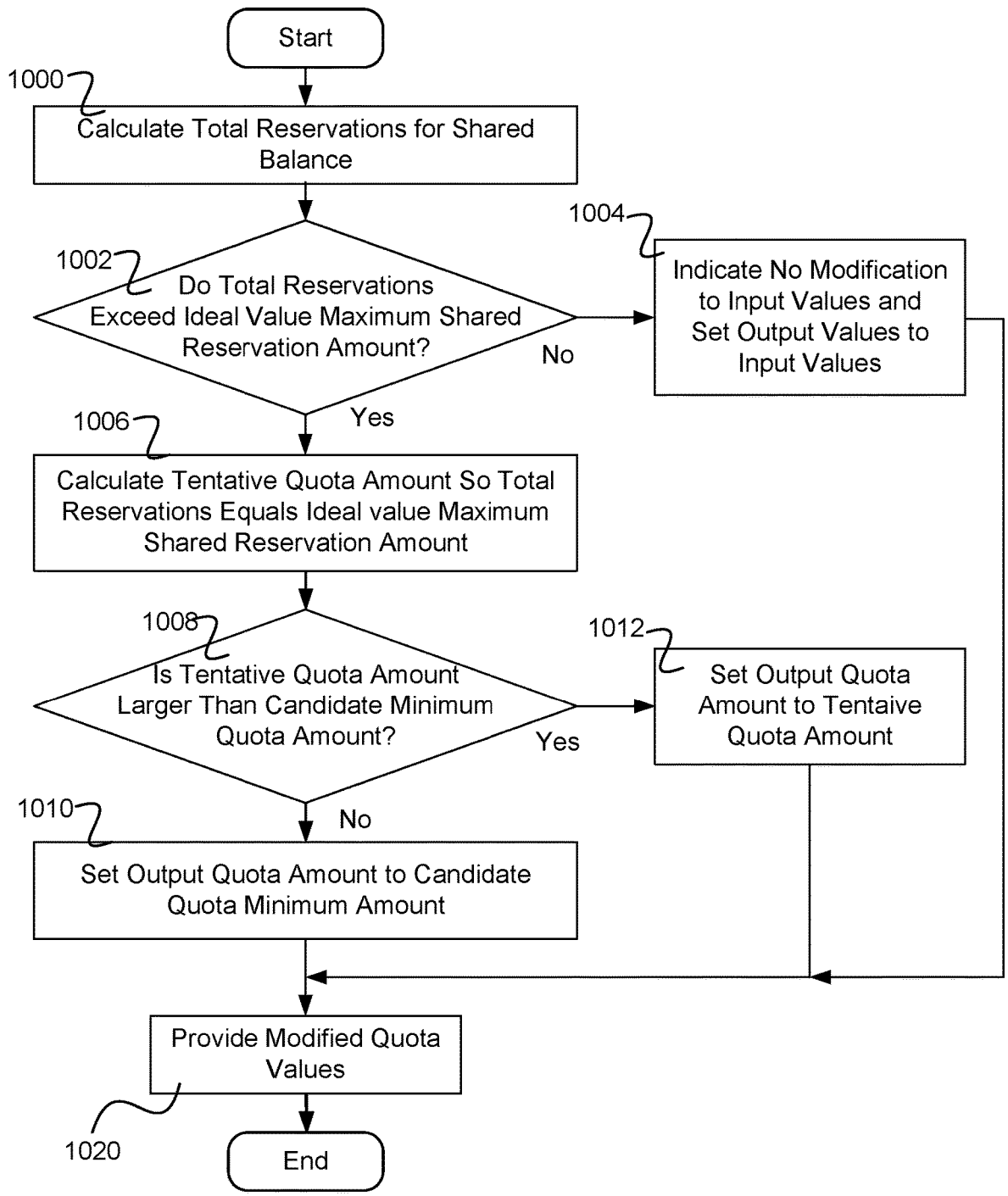
FIG. 10 is a flow diagram illustrating an embodiment of a process for a quota modification determiner based on a rate at which a shared balance is being impacted as quota is consumed by all the activities being authorized against the shared balance.

FIG. 10 is a flow diagram illustrating an embodiment of a process for a quota modification determiner based on a rate at which a shared balance is being impacted as quota is consumed by all the activities being authorized against the shared balance. In some embodiments, the process of FIG. 10 is used to implement a quota modification of the one or more quota modifications of 602 of FIG. 6. In some embodiments, a shared balance quota modification determiner (BSQMD) determines modifications to the input quota amount and validity time based on the rate at which a shared balance is being impacted as quota is consumed by all the activities being authorized against the shared balance. In some embodiments, an ideal value maximum shared reservation amount (IVMSRA) is defined or configured in the system. In various embodiments, IVMSRA values are defined or configured for each balance or class of balance. In the example shown, in 1000 total reservations for a shared balance are calculated. For example, during an authorization request for an activity, the BSQMD receives the candidate quota and input quota values from the candidate quota determiner or the prior quota modification determiner (depends on which workflow and ordering). The BSQMD executes the rating logic using the tariff plan details that apply to that activity and tracks what balance reservations are necessary based on authorizing the input quota amount. The BSQMD then adds together these calculated reservation amounts and any existing reservations on the same balances from other activities that are sharing the balances. In 1002, it is determined whether total reservations on any shared balance exceed an ideal value maximum shared reservation amount. In the event that no total reservations exceed the associated ideal value maximum shared reservation amount, then in 1004 no modification to input values is indicated and output values are set to input values and control passes to 1020. For example, if authorizing the input quota amount does not require any aggregate balance reservations that exceed the associated IVMSRA, the BSQMD does not modify the input quota amount or validity time. In the event that a total reservations exceeds the associated ideal value maximum shared reservation amount, then in 1006 a tentative quota amount is calculated so that the total reservation equals the ideal value maximum shared reservation amount and control passes to 1008. For example, in the event that authorizing the input quota amount does require an aggregate balance reservation that would exceed the associated IVMSRA, the BSQMD calculates how much quota can be authorized such that the aggregate balance reservation equals the IVMSRA rather than exceeds it. In 1008, it is determined whether the tentative quota is larger than the candidate minimum quota amount. In the event that the tentative quota is not larger than the candidate minimum quota amount, then in 1010 the output quota amount is set to the candidate minimum quota amount and control passes to 1020. In the event that the tentative quota is larger than the candidate minimum quota amount, then in 1012 the output quota amount is set to the tentative quota amount and control passes to 1020. In 1020 the modified output quota values are provided. For example, the output quota amount and the output validity time are provided as the output of the quota management system.

Figure 11:
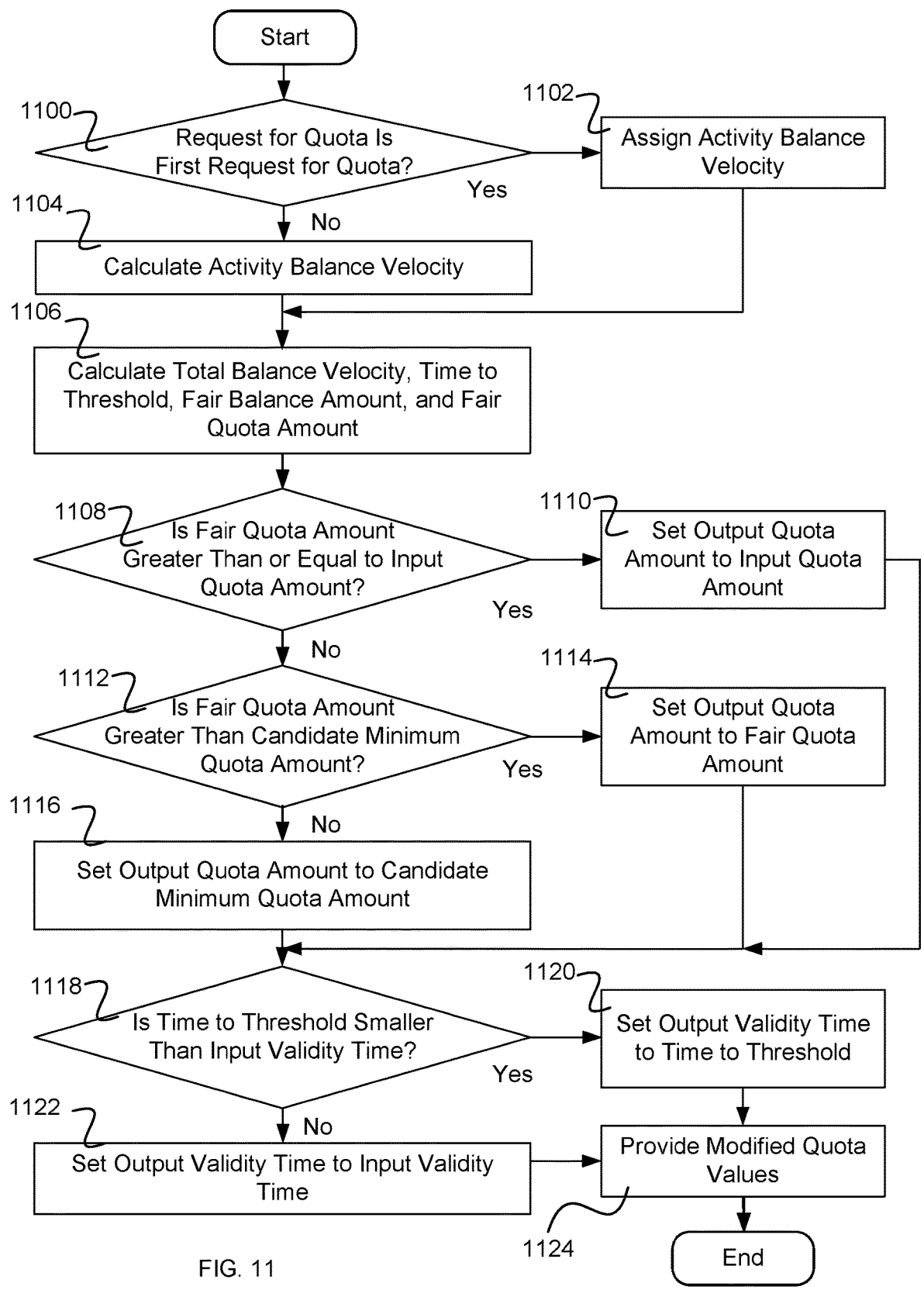
FIG. 11 is a flow diagram illustrating an embodiment of a process for a quota modification determiner based on a balance-threshold distance.

FIG. 11 is a flow diagram illustrating an embodiment of a process for a quota modification determiner based on a balance-threshold distance. In some embodiments, the process of FIG. 11 is used to implement a quota modification of the one or more quota modifications of 602 of FIG. 6. In some embodiments, a balance-threshold distance quota modification determiner (BTQMD) determines proposed or actual quota modifications based at least in part on the estimation or actual measurement of the distance between a current balance value and a defined or configured threshold balance value for the balance (e.g., a balance-threshold distance). In some embodiments, the BTQMD keeps track of the value of a balance at the time a quota is calculated, then calculates an estimated total rate of change for the balance by subtracting the prior balance value from the current balance value and dividing the result by the amount of time elapsed since the prior value was measured (total balance velocity or TBV) (e.g., if a prior quota calculation tracked that the balance value was 30 at time T, and the current balance value is 10 and the current time is T+10 seconds, then the TBV is (10−30)/10=(−2) per second). In various embodiments, the TBV may be calculated using only balance data points collected for the activity being authorized, for all activities being authorized for a single connectivity device, for all activities across all connectivity devices that are using the balance for authorization, or any combination thereof. In various embodiments, the TBV is calculated using only the current balance data and the prior balance data, or it is calculated using a weighted average of the last N balance data measurements, using any integer larger than 1 for N and using any common weighting algorithm, or in any other appropriate manner. In various embodiments, the TBV is calculated using any other applicable method for accurately estimating the total rate of change to the balance. In some embodiments, the BTQMD also calculates an estimated rate of change for a balance based only on the charges for that activity (ABV). In some embodiments, the usage rating module that calculates the actual balance impacts for actual quota used and updates the account balances with these impacts passes to the BTQMD the total set of balance impacts for the actual quota used and the time period over which that usage occurred. The BTQMD then divides the amount of each balance impact by the time period to calculate the rate of balance impact for a specific activity (ABV) (e.g. if the total balance impact from the actual usage was (−20) and the interval of the usage was 10 seconds, then the ABV is (−20)/10=(−2) per second). In various embodiments, the ABV is calculated using only the prior balance impact data, or it is calculated using a weighted average of the last N balance impact data measurements, using any integer larger than 1 for N and using any common weighting algorithm, or any other appropriate method for accurately estimating the rate of change to the balance caused by a specific activity. In the example shown, in 1100 it is determined whether the request for quota is a first request for quota. In the event that it is a first request for quota, in 702 an activity balance velocity is assigned. For example, during the initial authorization request for an activity, there is no prior balance impact data for the activity so the BTQMD cannot calculate the ABV as above, so the BTQMD assigns a value to the ABV. In various embodiments, a defined or configured initial value is assigned to ABV, system-wide statistics are examined and an estimated initial value for ABV is derived, or it any other reasonable initial value is assigned to ABV. In the event that the request for quota is not the first request for quota, then in 1104, an activity balance velocity is calculated. For example, during an authorization request for an activity, the BTQMD receives the candidate quota and input quota values from the candidate quota determiner or the prior quota modification determiner (depends on which workflow and ordering). The BTQMD executes the rating logic using the tariff plan details that apply to that activity to determine what balance reservations are necessary based on authorizing the input quota amount. For each balance requiring a reservation the quota amount that is associated with that balance is multiplied by the quota consumption rate (available as described above) then the balance reservation amount is divided by this product to calculate the ABV. In 1106, a total balance velocity, a time to threshold, a fair balance amount, and a fair quota amount are calculated for each balance that requires a reservation. For example, the BTQMD calculates an estimated time-to-threshold for the balance by taking the difference between the current balance value and the next defined or configured threshold and dividing it by the TBV (e.g., if current balance is 20 and next threshold is 10 and TBV is (−2)/second, then the time-to-threshold (TTT) is (10−20)/(−2)=5 seconds). The BTQMD then multiplies the ABV by the TTT to calculate how much of a balance should be allocated to this activity such that the authorized quota will be consumed just as the balance reaches the defined or configured threshold—the "fair balance amount". The BTQMD then uses the rating logic and applicable tariff plans to calculate how much quota can be authorized by reserving the fair balance amount—the "fair quota amount". In 1108, it is determined whether the fair quota amount is greater than or equal to the input quota amount. In the event that the fair quota amount is greater than or equal to the input quota amount, then in 1110 the output quota amount is set to the input quota amount and control passes to 1118. For example, in the event that the fair quota amount is greater than or equal to the input quota amount, the BTQMD does not modify the input quota amount. In the event that the fair quota amount is not greater than nor equal to the input quota amount, then in 1112 it is determined whether the fair quota amount is greater than the candidate minimum quota amount. In the event that the fair quota amount is greater than candidate minimum quota amount, then in 1114 the output quota amount is set to the fair quota amount and control passes to 1118. In the event that the fair quota amount is not greater than candidate minimum quota amount, then in 1116 the output quota amount is set to the candidate minimum quota amount and control passes to 1118. For example, in the event that the fair quota amount is less than the input quota amount, the BTQMD sets the output quota amount to the greater of the fair quota amount and the candidate minimum quota amount. In 1118, it is determined whether the time to threshold is smaller than the input validity time. In the event that the time to threshold is smaller than the input validity time, then in 1120, the output validity time is set to the time to threshold and control passes to 1124. In the event that the time to threshold is not smaller than the input validity time, then in 1122, the output validity time is set to the input validity time and control passes to 1124. In 1124, the modified quota values are provided. For example, the output quota amount and the output validity time are provided as the output of the quota management system.

In some embodiments, the BTQMD accommodates the fact that TBV and ABV are estimated values and the actual total rate of change and activity rate of change for a balance may constantly change based on many factors, including how many activities are sharing the balance, the speed of the networks being used, the congestion level of the networks being used, and any other factor that could impact the actual rate of quota consumption by the activities that are being authorized against the balance. In some embodiments, a geometric decay curve equation is used to provide a "cushion" against inaccuracies or sudden changes in the ABV, TBV, or TTT. A decay strength coefficient is defined or configured in the system. In various embodiments, a decay strength coefficient (DSC) is any integer or real number greater than 1. Instead of multiplying the ABV by the TTT to calculate the fair balance amount as above, the BTQMD instead multiplies the ABV by TTT/DSC to calculate the fair balance amount. This reduces the fair balance amount by a factor of DSC from the process in FIG. 11. This makes it more likely that the calculated fair quota amount is less than the input quota amount and that the input quota amount is thus adjusted downward. In addition, in the event that the input quota amount is adjusted downward to the fair quota amount, the input validity time is set to TTT/DSC in the event that the value TTT/DSC is smaller than the input validity time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a quota, comprising;
an input interface configured to:
receiving a current workload, wherein the current workload is determined from one or more of the following workload parameters: CPU utilization, network utilization, storage system utilization, memory utilization, rate of requests being received, and latency of responses to requests being received;
a processor configured to:
determine whether the current workload is less than or equal to an ideal target workload; and
in response to the current workload being less than or equal to the target workload:
indicate no modification to input values for an activity, wherein the input values comprise an input quota amount and an input validity time;
set output values for the activity to the input values, wherein the output values comprise an output quota amount and an output validity time; and
provide the output values.

2. A system as in claim 1, wherein the processor is further configured to, in response to the current workload not being less than or equal to the target workload, calculate a modification ratio based at least in part on a difference between the current workload and the target workload.

3. A system as in claim 2, wherein the processor is further configured to determine a new target amount for the activity.

4. A system as in claim 3, wherein the processor is further configured to determine whether the new target amount is greater than a maximum quota.

5. A system as in claim 4, wherein the processor is further configured to, in response to the new target amount being greater than the maximum quota, set the output quota amount to the maximum quota.

6. A system as in claim 4, wherein the processor is further configured to, in response to the new target amount not being greater than the maximum quota, set the output quota amount to the new target amount.

7. A system as in claim 6, wherein the processor is further configured to determine a new target validity time.

8. A system as in claim 7, wherein the processor is further configured to determine whether the new target validity time is greater than a maximum time.

9. A system as in claim 8, wherein the processor is further configured to, in response to the new target validity time being greater than the maximum time, set the output validity time to the maximum time.

10. A system as in claim 8, wherein the processor is further configured to, in response to the new target validity time not being greater than the maximum time, set the output validity time to the new target validity time.

11. A method for determining a quota, comprising;
receiving a current workload, wherein the current workload is determined from one or more of the following workload parameters: CPU utilization, network utilization, storage system utilization, memory utilization, rate of requests being received, and latency of responses to requests being received;

determining, using a processor, whether the current workload is less than or equal to an ideal target workload; and in response to the current workload being less than or equal to the target workload:

indicating no modification to input values for an activity, wherein the input values comprise an input quota amount and an input validity time;

setting output values to input for the activity to the input values, wherein the output values comprise an output quota amount and an output validity time; and providing the output values.

12. A method as in claim 11, wherein in response to the current workload not being less than or equal to the target workload, calculating a modification ratio based at least in part on a difference between the current workload and the target workload.

13. A method as in claim 12, wherein determining a new target amount for the activity.

14. A method as in claim 13, wherein determining whether the new target amount is greater than a maximum quota.

15. A method as in claim 14, wherein in response to the new target amount being greater than the maximum quota, setting the output quota amount to the maximum quota.

16. A method as in claim 14, wherein in response to the new target amount not being greater than the maximum quota, setting the output quota amount to the new target amount.

17. A method as in claim 16, wherein determining a new target validity time.

18. A method as in claim 17, wherein determining whether the new target validity time is greater than a maximum time.

19. A method as in claim 18, wherein in response to the new target validity time being greater than the maximum time, set the output validity time to the maximum time.

20. A method as in claim 18, wherein in response to the new target validity time not being greater than the maximum time, set the output validity time to the new target validity time.

21. A computer program product for determining a quota, the computer program product being embodied in a non-transitory computer readable storage medium and comprising computer instructions for:

receiving a current workload, wherein the current workload is determined from one or more of the following workload parameters: CPU utilization, network utilization, storage system utilization, memory utilization, rate of requests being received, and latency of responses to requests being received;

determining, using a processor, whether the current workload is less than or equal to an ideal target workload; and in response to the current workload being less than or equal to target the target workload:

indicating no modification to input values for an activity, wherein the input values comprise an input quota amount and an input validity time;

setting output values to input for the activity to the input values, wherein the output values comprise an output quota amount and an output validity time; and providing the output values.

\* \* \* \* \*